(12) United States Patent
Rail

(10) Patent No.: US 6,167,819 B1
(45) Date of Patent: Jan. 2, 2001

(54) TREE PLANTING APPARATUS AND METHOD OF USING SAME

(76) Inventor: Clarence H. Rail, 7129 NE. 29$^{th}$ St., Ankeny, IA (US) 50021

( * ) Notice: Under 35 U.S.C. 154(b), the term of this patent shall be extended for 0 days.

(21) Appl. No.: 09/525,396

(22) Filed: Mar. 15, 2000

(51) Int. Cl.$^7$ .............................. A01C 11/02; A01G 23/02
(52) U.S. Cl. ............................................... 111/101
(58) Field of Search .................................. 111/101, 100, 111/102; 37/302

(56) References Cited

U.S. PATENT DOCUMENTS 5,299,857 * 4/1994 Zanetis ............................. 111/101 X
5,485,691 * 1/1996 Stevens et al. ................... 111/101 X

* cited by examiner

Primary Examiner—Christopher J. Novosad
(74) Attorney, Agent, or Firm—Zarley, McKee, Thomte, Voorhees & Sease

(57) ABSTRACT

An apparatus for planting elongated tree slips in soil includes a movable frame, and at least one row planting unit. The row planting unit includes a lower portion, an upper portion pivotally mounted to the frame, and a driver assembly having an elongated plunger for applying a purely longitudinal planting force to one end of the tree slips to drive them individually into the ground. A retractable and extensible stabilizing mechanism is operatively positioned between the frame and the row planting unit for pivoting the latter with respect to the frame during the application of the planting force. A brake is also provided on the lower portion of the row planting unit for halting movement of the lower portion of the row planting unit across the ground. The brake, stabilizing mechanism and plunger are coordinated so that the plunger is maintained in a position directly over the slip being driven, despite the movement of the frame across the soil. The planter can be equipped with a programmable logic controller and a planting signal generator, such as a signal wheel, a timer, or global positioning system. The planter also includes a specialized pivotal receiver assembly for handling the tree slips and positioning them under the plunger, and an on-board sensing system in the row planting unit. Wheeled and sled supported embodiments are shown. Furthermore, an embodiment with a drip hose nozzle sensing assembly is also provided.

25 Claims, 17 Drawing Sheets

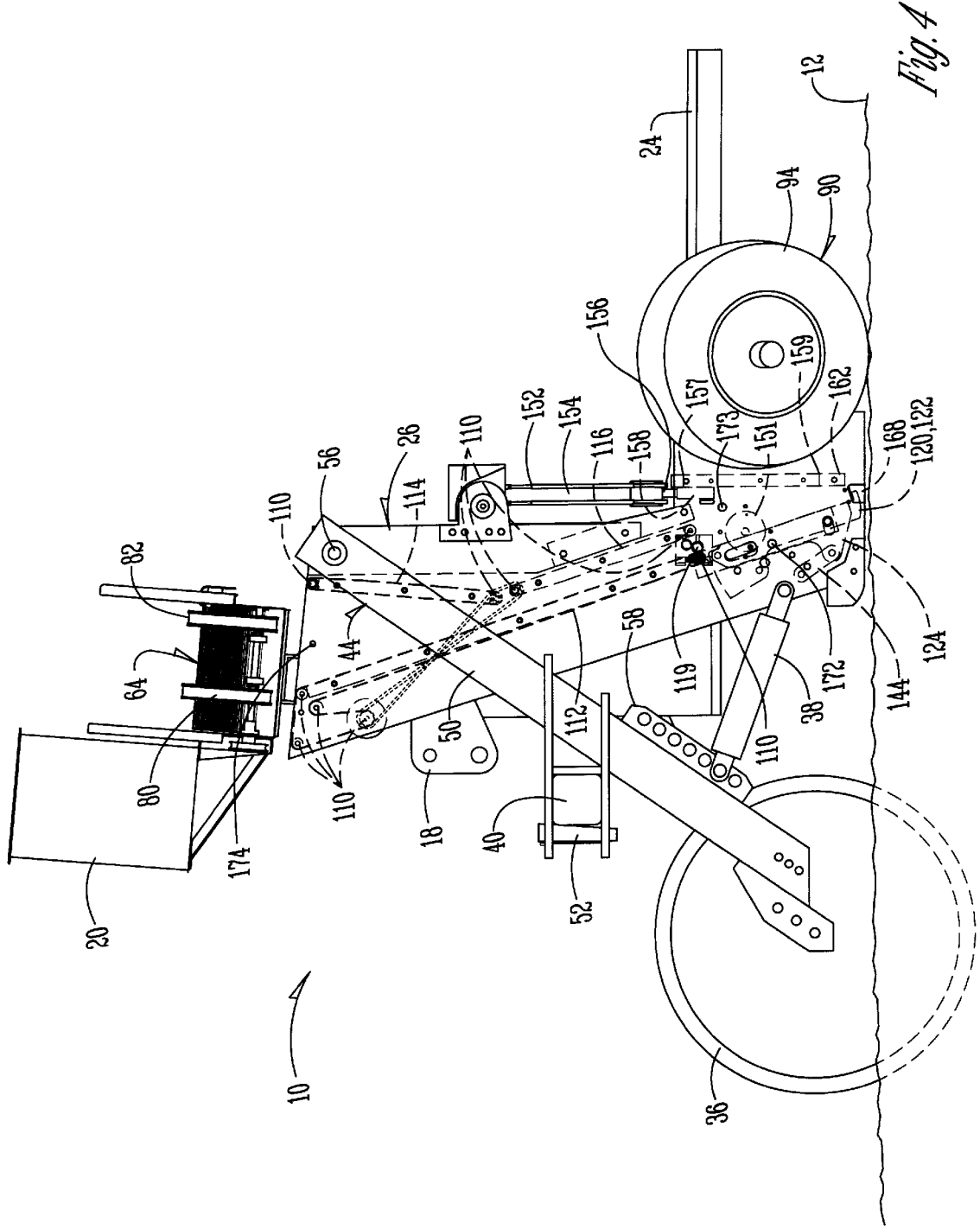

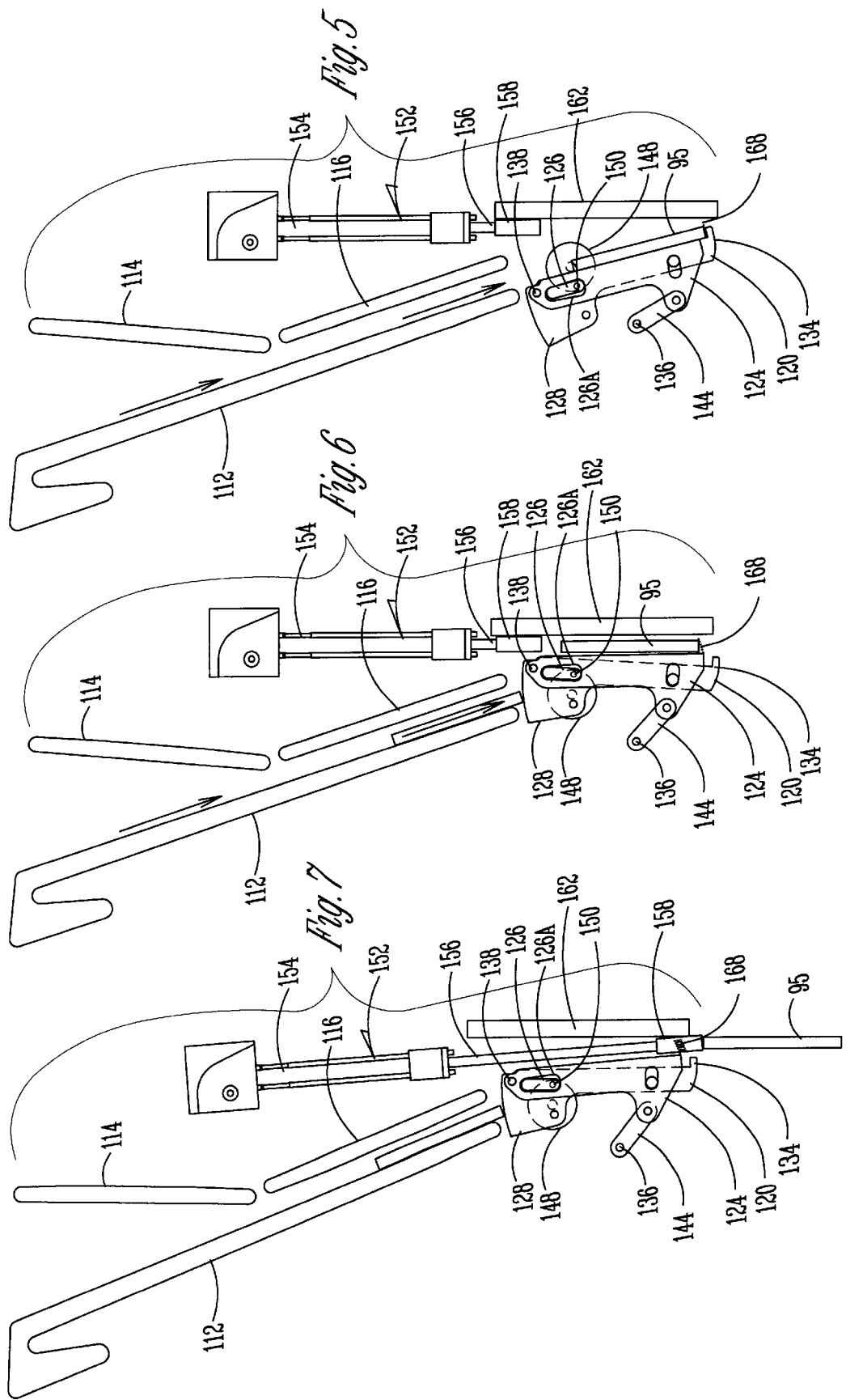

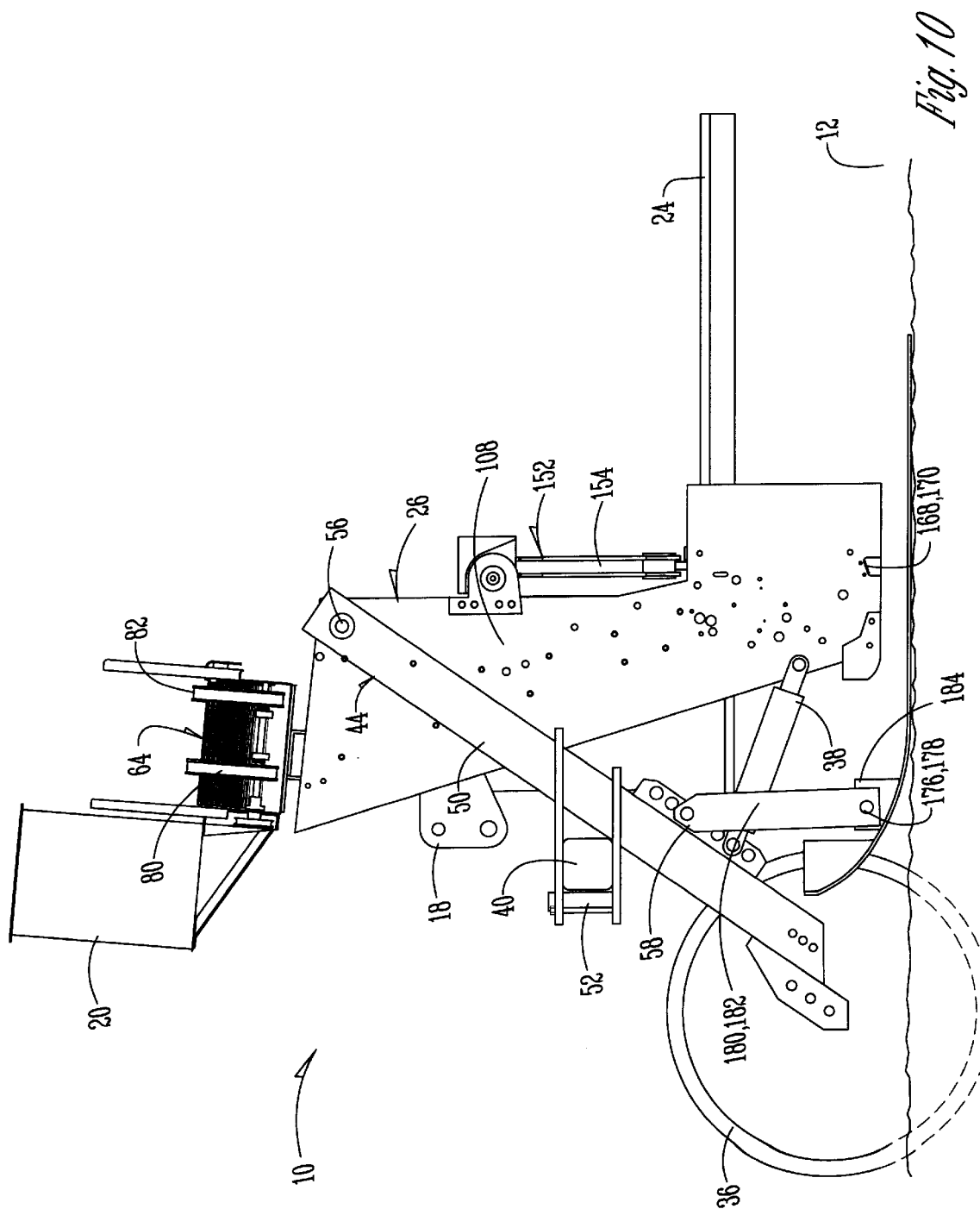

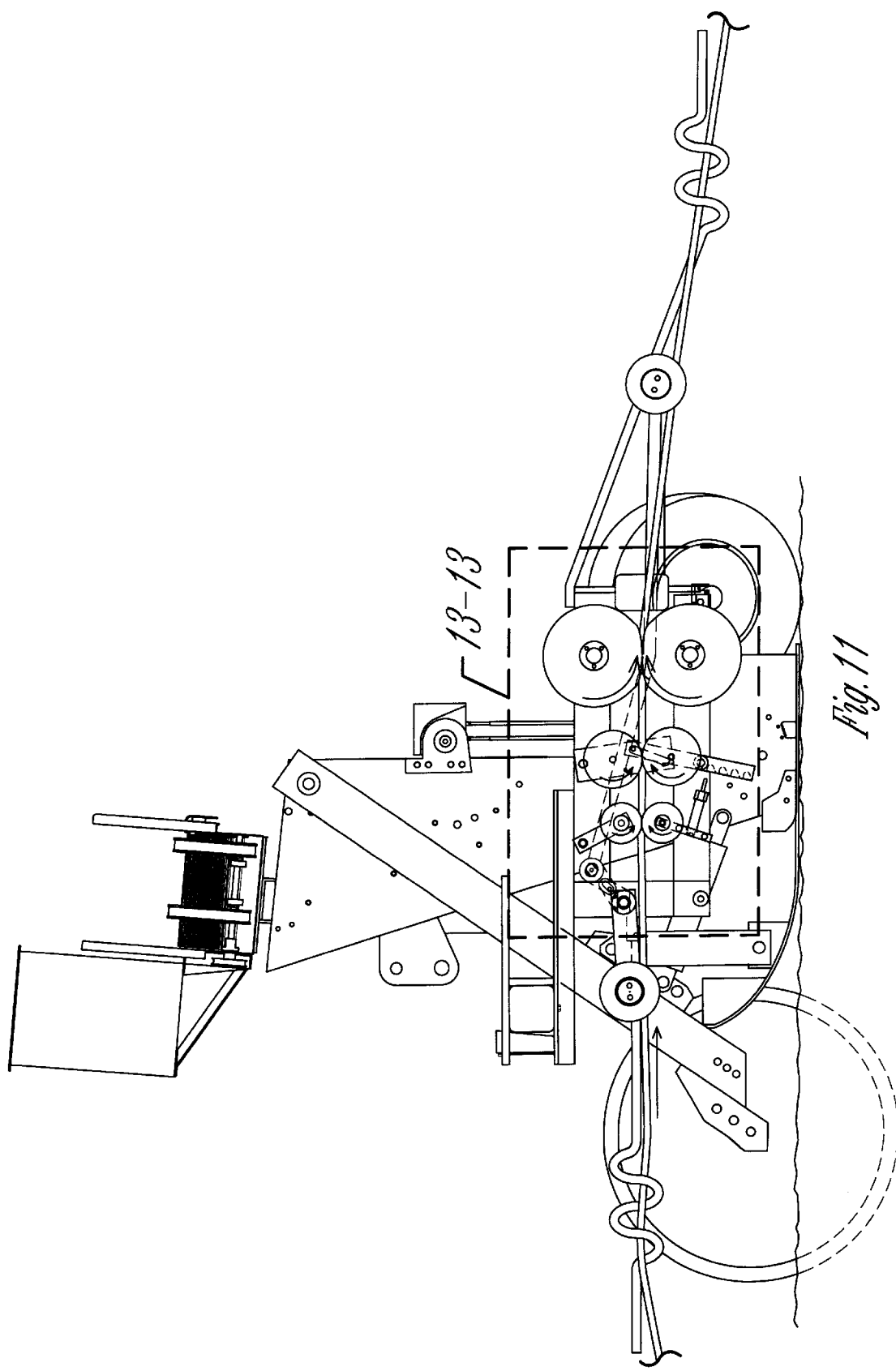

TREE PLANTING APPARATUS AND METHOD OF USING SAME

BACKGROUND OF INVENTION

The present invention relates to the field of agriculture, including forestry and horticulture. More particularly, this invention relates to means and methods for planting trees and the like.

Trees are often harvested and processed for paper, cardboard, or other wood-based products. It is common, and in some localities required, to plant new trees to replace the trees harvested so as to replenish and maintain our forests.

Hybrid trees, which produce no seeds, can only be reproduced from cuttings ("slips") taken from existing trees. These cuttings or slips are often available from nurseries in the form of sticks having a plurality of bud sites thereon. The sticks come in various lengths and diameters depending upon the type of tree and cultural practices in the local area.

Manually planting the sticks by driving them into the ground at desired locations has been the primary conventional method utilized, but this method is slow, highly labor-intensive and generally costly. The slips must be carefully planted at predetermined intervals so that they protrude a given distance above the ground and at least one of the bud sites is exposed. Recently, mechanized planting has been attempted, but the early prototype tree planting machines had circular shaped stick drivers with a tangentially mounted hammer head that struck the slips in an essentially arcuate motion to drive them into the ground as the planter moved. This tended to damage the slips and often left the planted slip leaning at an undesirable angle with respect to vertical. Furthermore, the ground speed of such tree planting machines had to be matched closely to the rotational speed of the driver, thus limiting the speed of planting. Improved means and methods for planting trees are needed.

Therefore, a primary objective of the present invention is the provision of an improved means and method for planting trees.

A further objective of the present invention is the provision of a machine for planting trees that can be drawn behind a tractor with a conventional three-point hitch.

A further objective the present invention is the provision of a method for planting trees that can utilize global positioning technology to precisely position the trees, whereby cultivation can take place between the planted trees to control weeds.

A further objective of this invention is the provision of a machine for planting trees that drives the slips into the ground with a purely vertical linear force so as not to damage or split the slips.

A further objective of this invention is the provision of a means for planting trees that utilizes a planting signal from a sensor that locates nozzles in a drip hose and plants the slips closely adjacent to the nozzles.

A further objective of the present invention is a provision of a means and method for planting trees that is economical, accurate and reliable.

SUMMARY OF THE INVENTION

The present invention relates to a planter and a method of using it to plant trees and the like. The planter is drawn along the ground behind a tractor with a three point hitch. The planter has a frame, a stick hopper, a main conveyor assembly, a operator platform, one or more row planting units with brakes thereon, a generator, an electrical panel having a programmable logic controller (PLC), a planting signal generator, a coulter wheel to open the soil, and a vertical stabilizing mechanism.

The main conveyor assembly extends transversely across the planter and over the row planting unit(s). The row planting unit has a plurality of unit conveyors therein that guide the slip dropped by gravity into the space between the face plates of the row planting unit. The unit conveyors deliver the slip to a position above the receiver.

The receiver has a plurality of uniquely arranged receiver plates, the top portion of which a rotary motor pivots forwardly with respect to the direction of travel of the tractor to allow the slip above the receiver to be fed or loaded into the receiver by gravity. Some of the receiver plates have a toe portion to stop the fall of the slip. Another receiver plate, which has no toe portion, is connected to a linkage that pushes the slip off the toe portion of the other receiver plate as the receiver plates move from the load position and under the path of a substantially vertical driver mechanism in the plant position. A set of fingers prevents the slip from falling once the slip is no longer supported by the toe portion(s).

When the planting signal is received, the driver mechanism applies a downward planting force to the slip. The fingers resiliently deflect to allow the slip to be driven downwardly. In one embodiment, one or more wheels are provided on the row planting unit. As the downward force is applied to the slip, a hydraulic brake engages one of the wheels while a hydraulic cylinder pivots the entire lower row planting unit with respect to the frame to maintain the drive assembly in a constant position over the planting site, despite the forward movement of the planter. In another embodiment, a sled provided on the bottom of the row planting unit frictionally contacts the ground to provide braking action while the slip is driven into the ground.

Various methods of using the tree planter and generating a planting signal to the planter's programmable logic controller are disclosed.

BRIEF DESCRIPTION OF THE DRAWINGS

FIG. 4 is a side elevation view of the tree planting apparatus of FIG. 1.

FIGS. 5–7 are simplified side elevation views of the tree slip planting mechanism of the present invention at sequential stages of the tree planting cycle. For purposes of illustration, only two receiver plates are shown.

FIG. 10 is a side elevation view of another embodiment of the tree planting apparatus of this invention wherein a skid or sled is utilized instead of wheels.

FIG. 11 is a side elevation view of another embodiment of the present invention wherein the tree planting apparatus follows a drip hose through the field and a drip hose nozzle sensing mechanism generates signals for planting trees based upon nozzles sensed in the drip hose.

DETAILED DESCRIPTION OF THE PREFERRED EMBODIMENT(S)

I. Basic Planter with Signal Wheel

A. Basic Planter Structure

Figure 1:
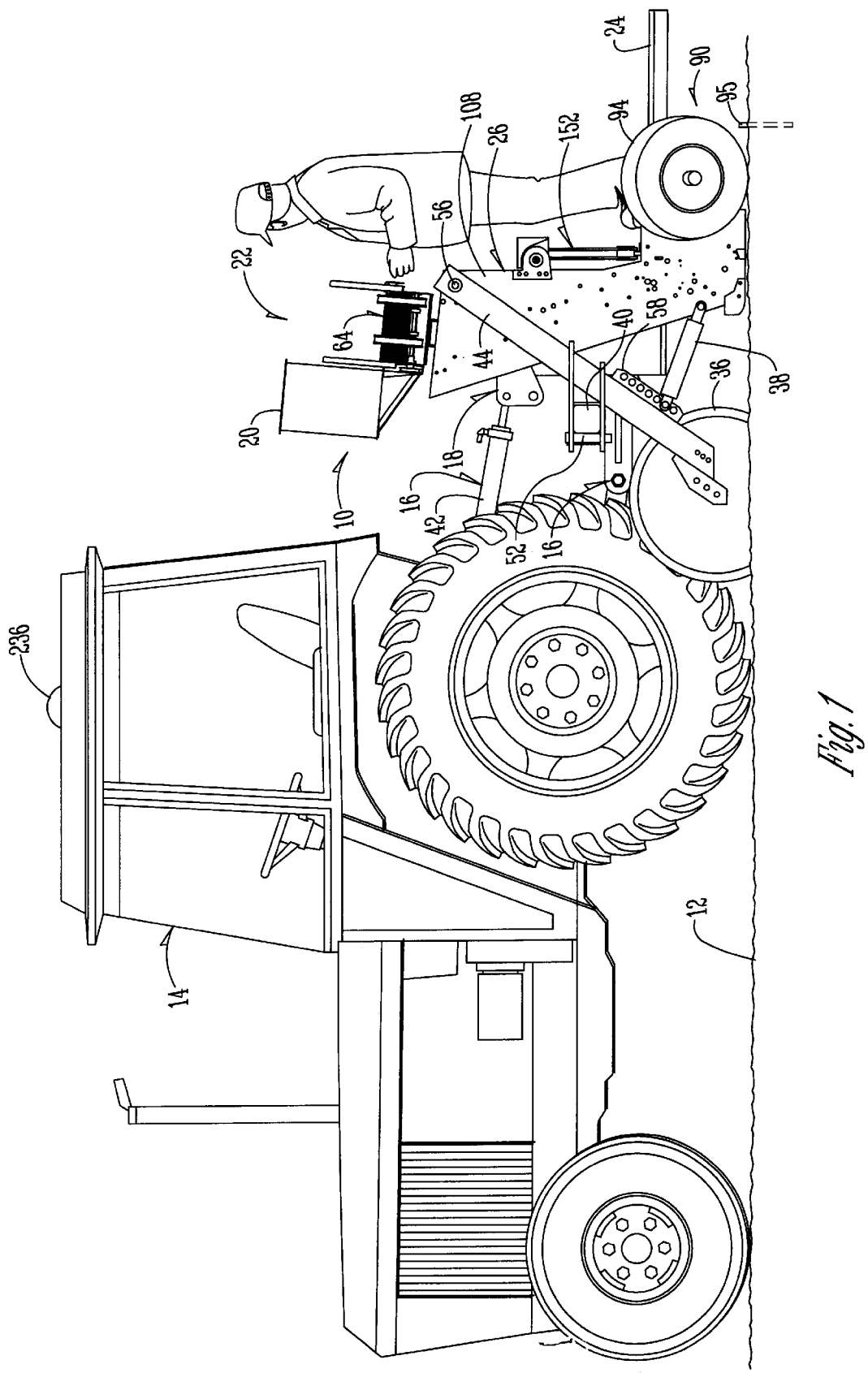
FIG. 1 is a side elevation view of the one embodiment of the tree planting apparatus of this invention drawn behind a tractor.

FIGS. 1–9A depict a first embodiment of the invention. In FIG. 1, the tree planting apparatus or planter 10 of this invention is drawn along the ground 12 in a conventional manner by a tractor 14 (or other propelling means) utilizing a three-point hitch 16. The planter 10 has a frame 18 attached to the three point hitch 16 of the tractor 14. In addition to the frame 18, the other major components of the planter 10 include a stick hopper 20, a main conveyor assembly 22, an operator platform 24, row planting units 26, 28, a generator 30, an electrical panel 32, a signal wheel 34, a coulter wheel 36, and a vertical stabilizing mechanism 38. Each of these major components will be discussed in detail below.

The frame 18 includes a tool bar 40 at its forward end that extends transversely to the direction of travel of the tractor 14. The tool bar 40 serves as a primary structural support beam or chassis for the planter 10. A three-point hitch 16 at the rear of the tractor 14 pivotally mounts the tool bar 40 to the tractor 14 in a conventional manner so that the whole frame 18 can be raised and lowered with respect to the ground 12 by the three point hitch 16 that includes a top link 42.

Figure 2:
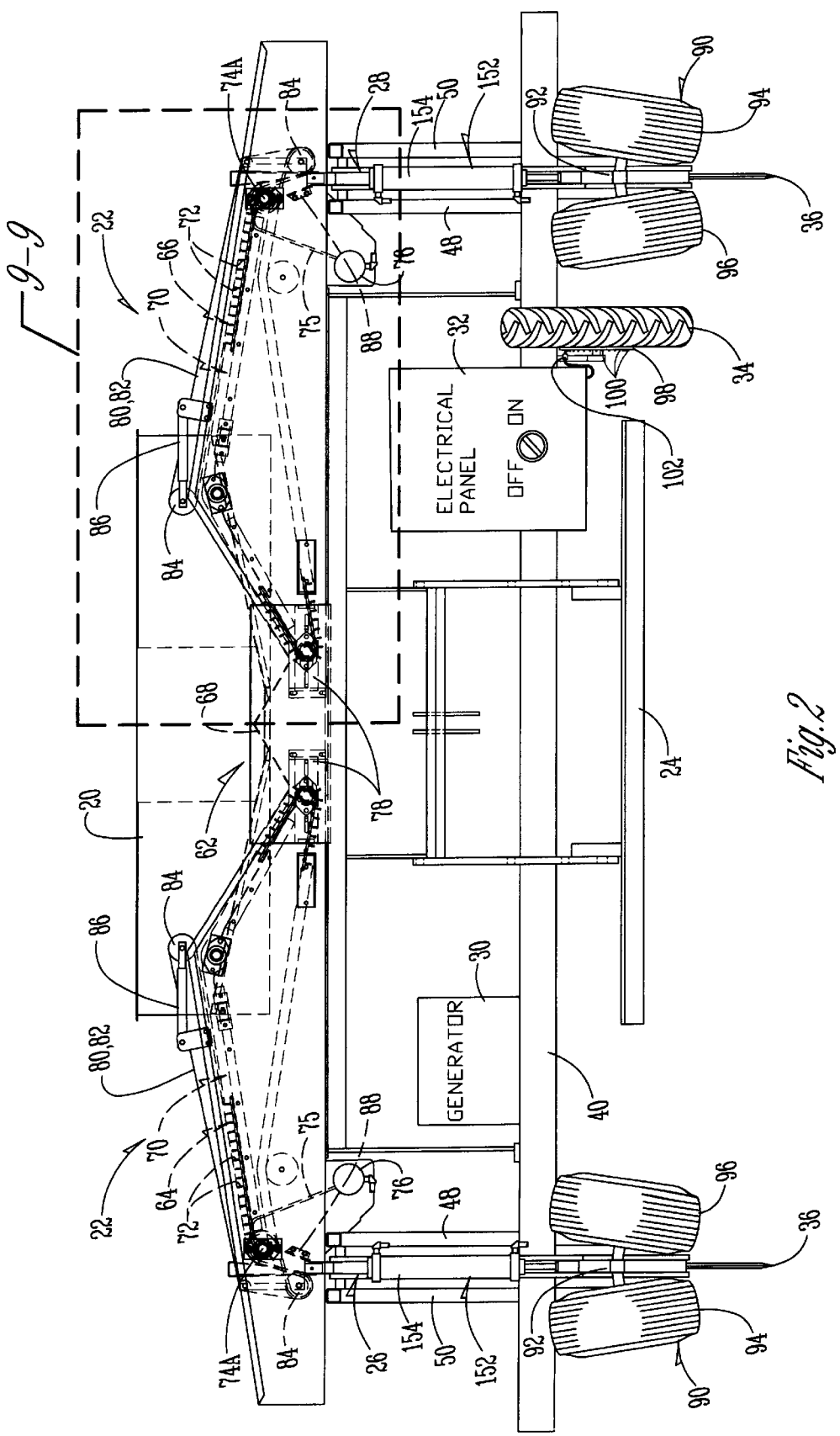
FIG. 2 is a rear elevation view of the tree planting apparatus of FIG. 1.

At least one side support arm assembly 44, 46 rigidly mounts to the frame 18 to support a respective row planting unit 26, 28. In the preferred embodiment shown, two pairs of laterally spaced side support arms assemblies 44, 46 are provided. As best seen in FIG. 2, the side support arm assemblies 44, 46 each include a pair of spaced parallel side support arms 48, 50. The side support arms 48, 50 have opposite lower and upper ends and an intermediate portion therebetween that rigidly mounts to the tool bar 40. Preferably, the intermediate portions of the side support arms have sleeve-like brackets 52, 54 rigidly attached respectively thereto. See FIGS. 3 and 4.

The sleeve-like brackets 52, 54 are slidably mounted on the tool bar 40 and clamped in place by bolts 49 and nuts 51. A pair of wedges 53, 55 further clamp the brackets 52, 54 to the tool bar 40. This arrangement allows the lateral position and spacing of the side support arm assemblies 44, 46 to be adjusted longitudinally along the tool bar 40 to accomplish any particular row spacing desired, but prevents undesirable twisting, deflection, or flexing of rest of the frame 18 relative to the tool bar 40.

A pivot shaft 56 interconnects the upper portions of the side support arms 48, 50 and extends through the row planting unit 26 or 28 interposed therebetween. Thus, row planting units 26, 28 pivotally mount to the upper end of each of the side support arm assemblies 44, 46.

A trench opening device, such as a coulter wheel 36, is rotatably mounted on the frame 18 between the lower end of each set of side support arms 48, 50. An adjustment bracket 58 is rigidly attached to the lower end of each of the side support arms above the coulter wheel 36. The adjustment bracket 58 has a plurality of spaced apart holes 60 therein. One end of a vertical adjustment/stabilizing mechanism (for example, a hydraulic cylinder) 38 is pivotally mounted to the bracket 58 at one of the holes 60. This arrangement of the holes 60 allows the depth of the row planting unit 26, 28 and other setup variables of the machine to be adjusted when the sled version of the planter is utilized (see FIG. 10).

Figure 3:
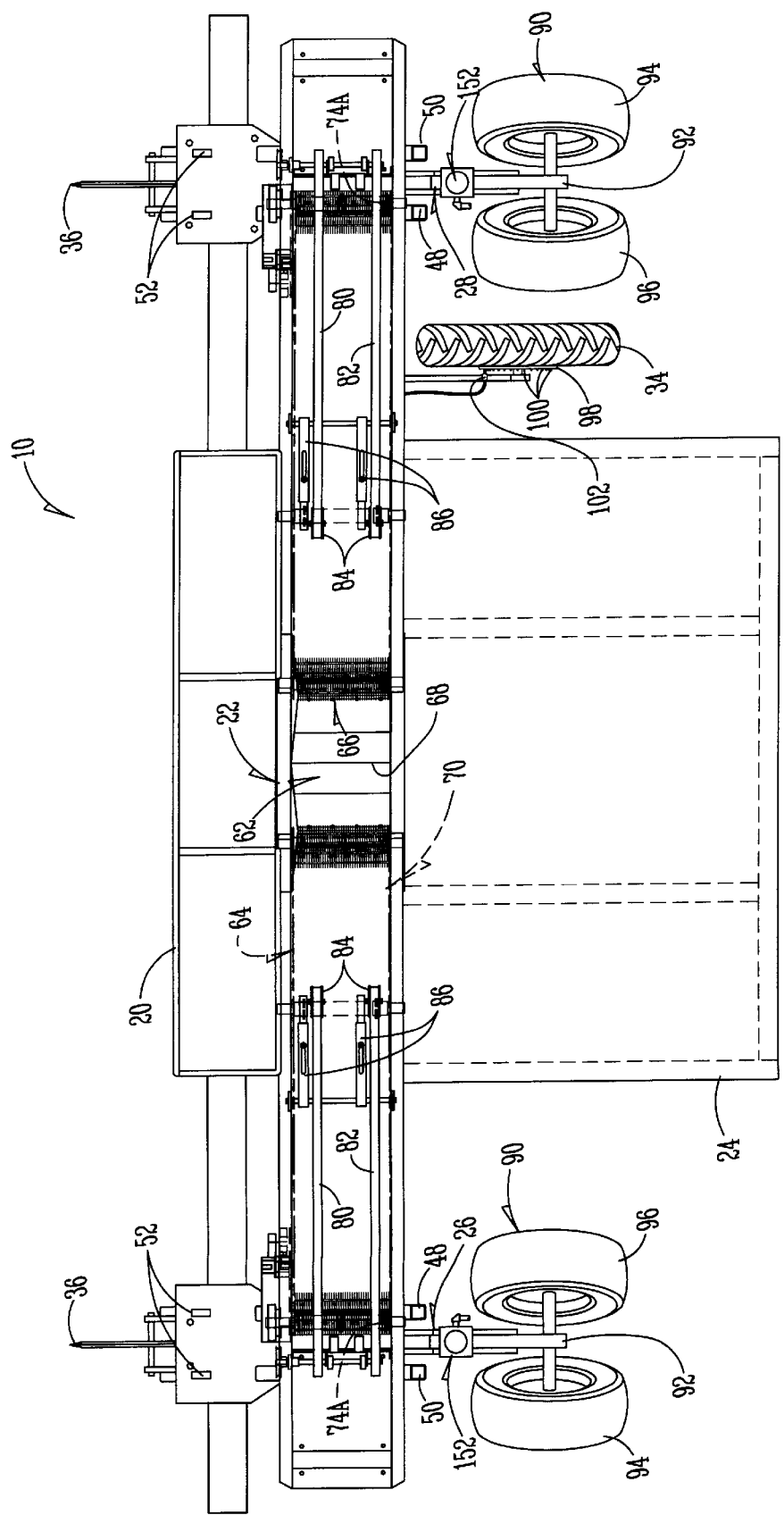
FIG. 3 is a top plan view of the tree planting apparatus of FIG. 1.

Referring to FIGS. 1 and 2, the main conveyor assembly 22 is mounted on the frame 18 and extends transversely between the row planting units 26, 28 so as to feed them with slips for planting. As best seen in FIGS. 1–3, the main conveyor assembly 22 includes a stick hopper 20, a centralized loading zone 62 rearward of the stick hopper 20, and left and right main stick conveyors 64, 66 adjacent the centralized loading zone 62. The left and right main conveyors 64, 66 correspond to the left and right row planting units 26, 28. The centralized loading zone 62 has a centrally raised or peaked bottom surface 68 that encourages the sticks to roll down the inclined sides of the peak and into the path of the main stick conveyors 64, 66.

The main stick conveyors 64, 66 are endless loop belt-type conveyors. The belts 70 are elongated in a direction tranverse to the planter's direction of travel. The belt 70 includes a plurality of outwardly protruding partitions 72 that extend across the width of the belt 70. The partitions 72 separate the belt 70 into open top compartments or cells 71 into which the sticks or slips loosely fit. The width of the conveyor belt 70 is preferably slightly longer than the length of the sticks or slips. The conveyor belts 70 extend around a plurality of sprockets and/or pulleys 74 as shown in FIG. 2.

Figure 9:
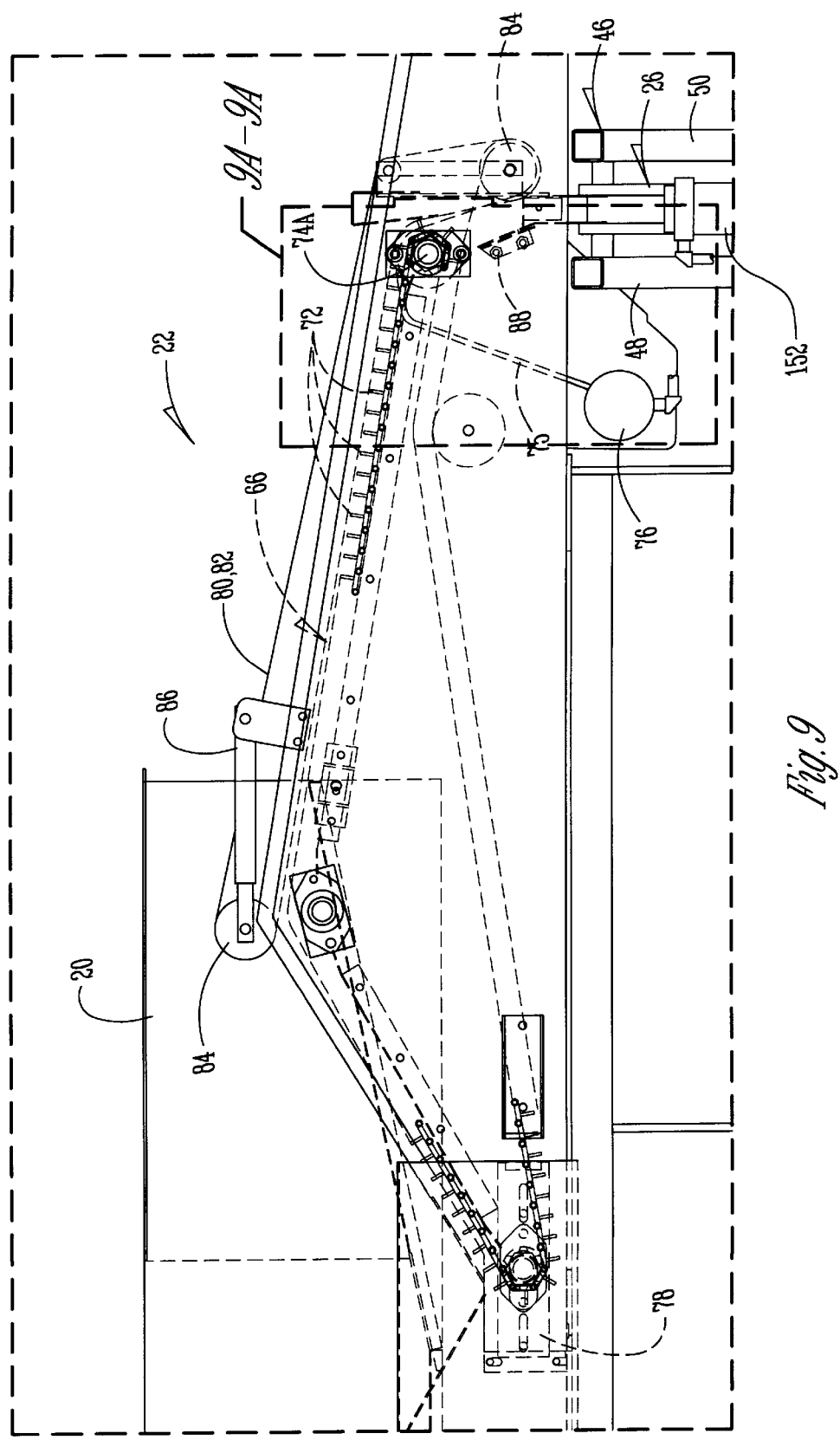
FIG. 9 is a rear end elevation view of the tree slip conveyor area designated 9—9 in FIG. 2.
Figure 9A:
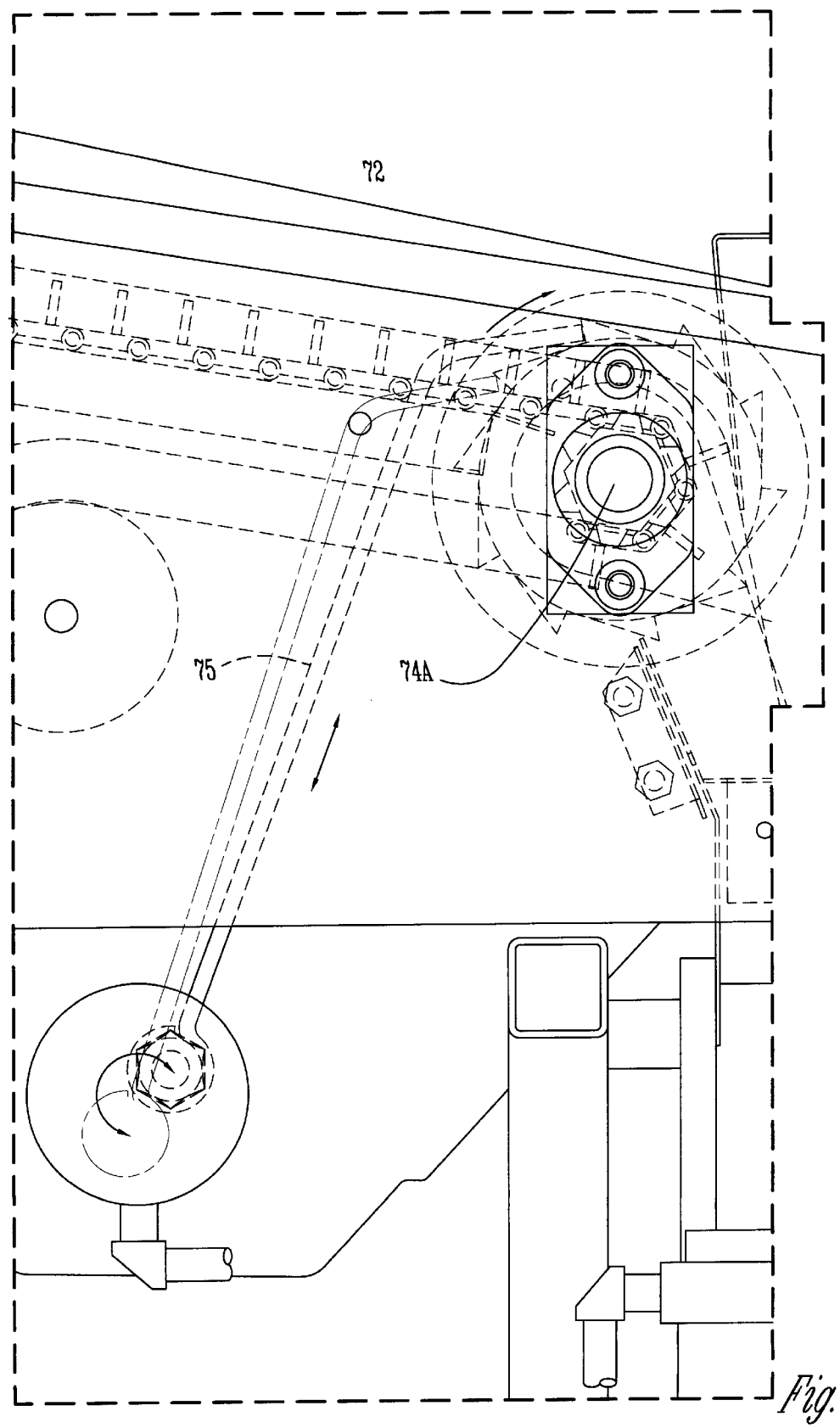
FIG. 9A is a rear end elevation view of the tree slip main conveyor drive mechanism enlarged from FIG. 9.

As best seen in FIGS. 9 and 9A, one of the sprockets or pulleys 74A for each belt 70 has a ratchet 73 drivingly connected thereto. The ratchet 73 is engaged by a pawl 75 attached to a hydraulic motor 76. The hydraulic motor 76 oscillates back and forth between two positions, and in doing so retracts or extends the pawl 75 relative to the ratchet 73. Thus, the ratchet 73 rotates intermittently to advance the conveyor a single cell at a time. Tension adjusting means 78 are provided on each of the main conveyors 64, 66.

Referring to FIGS. 2, 3, 9 and 9A, one or more spaced retaining or holddown bands 80, 82 also extend in an endless loop around pulleys 84 and over the upper portion of the main stick conveyors 64, 66. The bands 80, 82 cover the opposite ends of the sticks in the compartments or cells 71 until the sticks are directly over the row planting units 26, 28. The bands 80, 82 ensure that the sticks or slips do not bounce out of their respective compartments before planned. Continuous tension adjusting means 86 are also provided for the band pulleys 84.

A sensor 266 mounts on the frame 18 just; above each row planting unit 26, 28. The sensor 266 is preferably of the diffused light type, but other types of sensors can be utilized without detracting from the invention. The sensor 266 is positioned and aimed so that it can detect whether a stick or slip has fallen into the respective row planting unit 26, 28 from the cell 71 of the conveyor belt 70 as the belt turns back toward the center of the machine.

Referring again to FIGS. 1–3, the operator platform 24 mounts on the frame 18 rearwardly of the main conveyor assembly 22. The operator platform 24 is preferably substantially horizontal when the planter 10 is lowered into a ground-engaging position. In the preferred embodiment shown, the operator stands on the platform 24 and places slips from the stick hopper 20 into the loading zone 62. Movement of the conveyor belt 70 up the incline automatically loads the sticks into the cells. The operator manually removes any extra sticks from the cells of the belt 70, and can intervene to correct any jams or malfunctions, hit an emergency stop switch, or signal the driver of the tractor 14 to stop the planter 10 if necessary.

In this first embodiment, a wheel assembly 90 detachably mounts on each of the row planting units 26, 28. The wheel assembly 90 can be mounted in one of a plurality of different mounting holes (not shown) on the frame 18 so that it can be raised or lowered with respect to the respective row planting unit 26, 28 in a conventional manner to adjust the protrusion of the planted tree slip or stick 95. The wheel assembly 90 includes at least one wheel rotatably mounted to a wheel arm 90. Preferably, a pair of wheels 94, 96 are rotatably mounted to the wheel arm 92. The wheel arm 92 is generally Y-shaped so that the wheels 94, 96 tilt inwardly toward each other at the bottom and the rear to pack the soil against the planted stick. The wheels 94, 96 straddle the path of the coulter wheel 36 and the row planting unit 26 or 28. The wheel angle and tire configuration can be varied depending on the soil type and compaction requirements.

B. Signal Wheel

Figure 19:
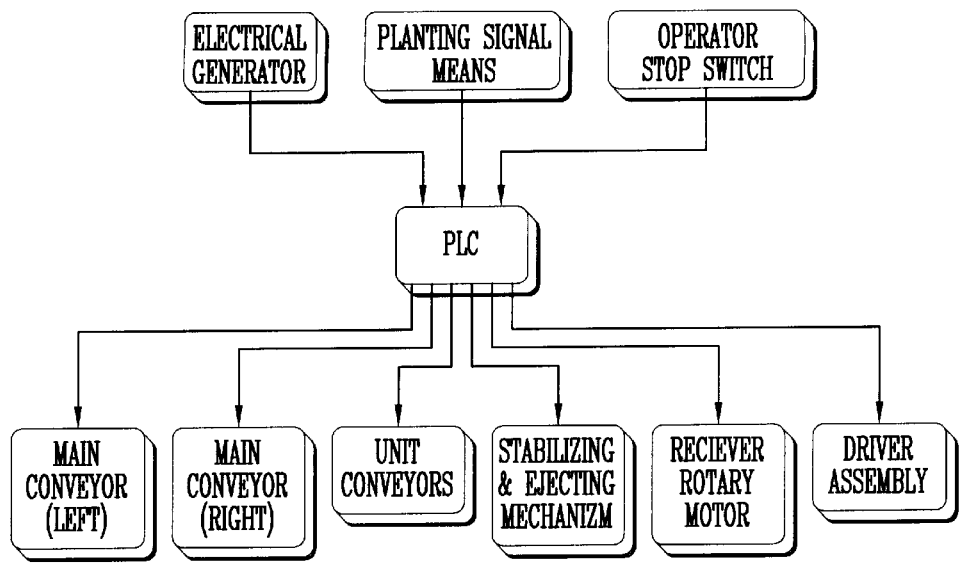
FIG. 19 is a chart illustrating the programmable logic controller and its relationship with the other major functional components of the planter according to the present invention. PLC outputs are shown for only one row planting unit because the outputs would be identical for additional row planting units.
Figure 20:
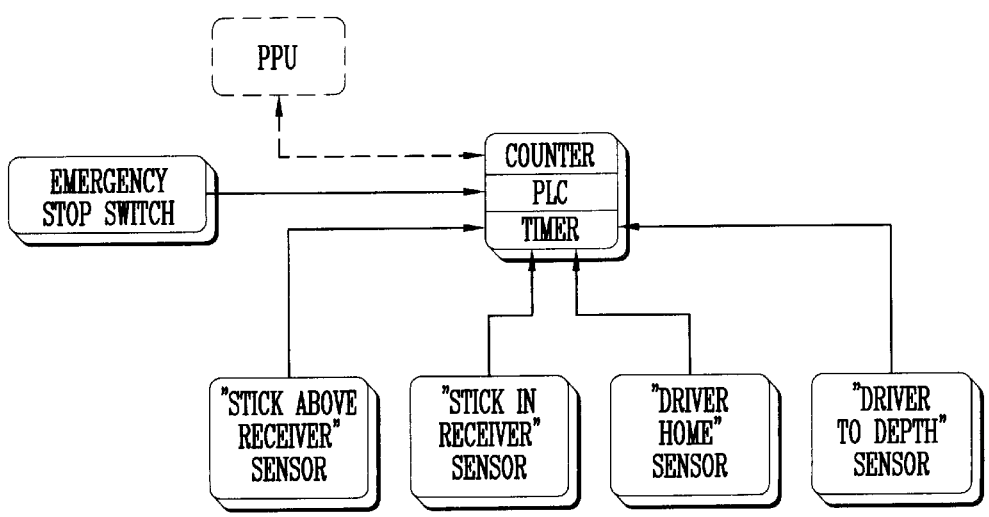
FIG. 20 is a chart illustrating the PLC in greater detail, as well as the sensor feedback and diagnostic system of the present invention.

FIGS. 2 and 3 illustrate one possible signal generating means that can be used in conjunction with the planter of this invention. A ground engaging planting signal wheel 34 rotatably mounts to the tool bar 40 of the frame 18. The signal wheel 34 is located between the row planting units wheel assemblies 90. The planting signal wheel 34 has a known diameter and thereby a known circumference. A round sprocket 98 is centrally mounted on the signal wheel 34 and extends radially outward from the axis of rotation of the signal wheel 34. The outer circumference of the sprocket 98 has at least one tooth thereon. More preferably, the sprocket 98 includes a plurality of equally spaced teeth 100 on its circumference. A pulse pickup (PPU) device 102 mounts on the frame 18 and is directed at the sprocket teeth 100 so as to generate a electrical pulse each time the planter 10 travels a given distance. The PPU device 102 is electrically connected to a programmable logic controller (PLC) 104 housed in the electrical panel 32 mounted on the frame 18 of the planter 10. The PLC 104 is illustrated in FIGS. 19 and 20.

The signal wheel 34 and the PPU 102 can be used even on the hose sensor embodiment discussed below in order to prevent false triggering caused by repair couplings often found in the sensed hose. The signal wheel 34 and PPU 102 can be used to establish when the next expected drip hose nozzle should logically appear and thereby treat any intervening signals from the drip hose nozzle sensing mechanism as falsely triggered by the repair couplings or other abnormalities in the hose.

C. Row Planting Units

The row planting units 26, 28 of this invention are unique. The row planting units 26, 28 can be operated independently or in concert with each other. As best seen in FIG. 3, each of the row planting units 26, 28 includes a rigid inner or inboard face plate 106 and a rigid outer or outboard face plate 108 generally registered with and spaced laterally outward from the inboard face plate 106. The space between the face plates 106, 108 is on the order of (but somewhat greater than) the maximum diameter of the sticks or slips to be planted.

1. Unit conveyors

As best seen in FIGS. 4–8, a plurality of pulleys 110, at least some of which are driven, are rotatably mounted between the face plates 106, 108. Endless loop belt-type tree guiding unit conveyors are formed around the pulleys 110 as shown. The guiding unit conveyors are actually three independent conveyors 112, 114, 116 that are run in a coordinated manner because of an interconnecting drive belt 101 and a drive motor 310 (see FIG. 21). As best seen in FIG. 4, the drive belt 101 preferably engages a portion of the drive shafts of the driven pulleys 100 that extends beyond one of the face plates 106 or 108. The belt 101 loops in a twisted or figure eight pattern over the pulleys 110 as shown to provide the desired rotation of the conveyors 112, 114, 116.

A first unit conveyor 112 is shown on the left in FIG. 4. The first unit conveyor 112 has an elongated conveyor belt that extends substantially horizontally between the pulleys 110 located near the top of the face plates 106, 108. The belt for the first unit conveyor 112 is then inclined downwardly and rearwardly. The first unit conveyor belt loops back upwardly and forwardly at the pulley 110 that is located just above a receiver assembly 118. The receiver assembly 118 mounts between the lower portions of the face plates 106, 108. Spaced second (upper) and third (lower) guide conveyors 114, 116 that generally oppose the first conveyor 112 are provided as shown on the right side of FIG. 4. Like the first conveyor 112, the upper and lower conveyors 114, 116 have belts that are driven by the drive belt 101 and the drive motor 310, but they rotate in a counterclockwise direction while the first conveyor belt 112 rotates clockwise.

These unit conveyors 112, 114, 116 guide the sticks or slips that fall by gravity one at a time from the main stick conveyor though the space between the face plates and into a slip holding channel above the receiver assembly 118. The unit conveyors 112, 114, 116 turn the sticks from a horizontal orientation into a generally vertical orientation. See FIGS. 5–7.

2. Receiver assembly

The receiver assembly 118 includes a plurality of adjacent pivotal plates 120, 124. The plates 120, 124 are arranged so that they alternate laterally between the face places 106, 108 of the row planting unit. In the preferred embodiment, there are five laterally spaced plates 120 and four plates 124 that are mounted in the respective spaces between the plates 120. Of course, the size and spacing of the plates 120, 124 can be adapted to accommodate the dimensions of the sticks to be planted. Washers (not shown) can be used to space the plates 120, 124 apart from each other and the face plates 106, 108 of the row planting unit 26, 28. The number of plates and their relative positions can also be switched so that the plates 124 outnumber the plates 120 and the plates 120 are mounted in the spaces between the plates 124. The plates 120 are substantially identical in their important attributes. Likewise, the plates 124 are substantially identical to each other. Therefore, only one pair of plates 120, 124 is shown in FIGS. 5–7.

The plate 120 has a substantially straight trailing edge for engaging the sticks or slips 95. The plate 120 includes an upper portion and a lower portion. The upper portion of plate 120 has a vertically elongated slot 126 extending therethrough and a stick engaging flange portion 128 that extends upwardly and forwardly (to the left in FIGS. 5–7) from the slot 126. The lower portion of the plate 120 has a round hole 130 therethrough for receiving a first pivot pin 132. The lower portion of the plate 120 includes a toe portion 134 that protrudes rearwardly from the bottom of the trailing edge.

The first pivot pin 132 mounts in a fixed position on one or more of the face plates 106, 108 so as to extend in a generally horizontal or lateral direction into the space between the face plates and pivotally support the receiver plates 120, 124. A second fixed pivot pin 136 mounts in the same manner, but is offset both vertically and forwardly from the first pin 132.

The plates 120, 124 generally register with each other. The upper portions of all of the plates 120, 124 are pivotally connected together above the slot 126 by a rivet 138 as shown. Like the plate 120, the plate 124 has a generally vertically elongated slot 126A that extends through its the upper portion. The rivet 138 passes through the slot 126A, too. However, the width of the slot 126A through the plate 124 increases from top to bottom. This allows the lower portion of the plate 124 and its trailing edge to pivot about the rivet 138 with respect to the other receiver plate(s) 120. The width differential between the top and bottom of the slot 126A in the plate 124 is sufficient to allow retraction of the toe portion 134 of the plate 120 with respect to the trailing edge of the plate 124 so that the slips can be ejected from the receiver assembly 118. The lower portion of the plate 124 includes a generally horizontal slot 140 that extends therethrough to receive the rivet or pivot pin 132, as well as a heel portion 142 that protrudes forwardly beyond the slot 140. A fixed length link arm 144 is pivotally connected to the heel portion 142 of the plate 124. Another end of the link arm 144 is pivotally connected to the second fixed pin 136.

3. Stick sensing system for receiver

Figure 8:
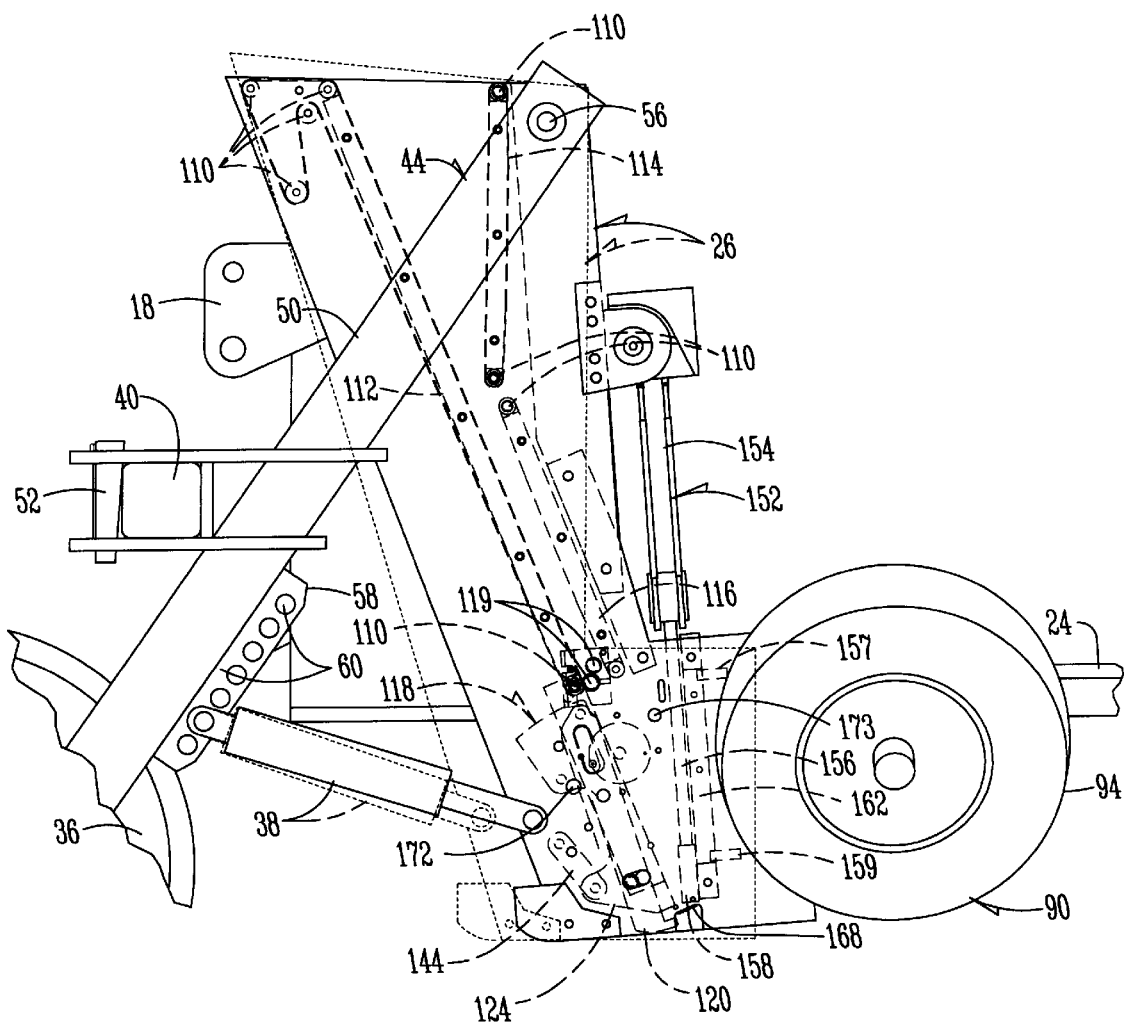
FIG. 8 is a side elevation view of the tree planting apparatus of this invention, which shows how the tree slip driving mechanism is kept directly over the planting spot, despite the movement of the tree planting apparatus through the field at a given rate of speed.

As best seen in FIG. 8, two sensors 119 mount on the lower portion of the row planting unit 26, 28 immediately above the receiver assembly 118 to indicate to the PLC 104 whether a stick is present in the stick holding channel located above the receiver assembly 118. A sensor 119 that reflects diffused light off of the stick has been found to perform well, but other types of sensors may also be utilized. The sensors 119 have a limited effective range. Therefore, two sensors are needed to detect the various sizes of sticks that can be encountered. The two sensors 119 are spaced apart physically and electrically connected to the PLC 104 in parallel with each other. Thus, if either one of the sensors 119 detects a stick, a "stick present" signal is sent to the PLC 104. If neither one of the sensors 119 detects a stick within a predetermined time, the PLC 104 provides a signal to the drive motor 76 to advance the main conveyor belt 70 and deliver another stick 95.

4. Means for pivoting the receiver assembly

In FIG. 4, a hydraulic motor 148, including a housing with a front cover thereon and an off-center drive pin 150 protruding from the front cover, rigidly mounts to the inner face plate 106 so that the front cover is generally flush with the inner face plate. The drive pin 150 extends horizontally into the space between the face plates 106, 108 and engages the slots 126, 126A in the upper portion of the respective receiver plates 120, 124. The motor 148 drives or oscillates the offset drive pin 150 back and forth in an arcuate path between two positions about 180 degrees apart. The lower portion of the plate 124 pivots with respect to plate 120 due to the fixed length link arm 144.

5. Stick driving assembly

Referring again to FIGS. 5–7, a hydraulic driver assembly 152 is rigidly attached to the row planting unit 26, 28 at one of the face plates 106, 108. The driver assembly 152 is operated by a conventional solenoid valve 324 (see FIG. 21) and includes a hydraulic cylinder 154 having a conventional piston (not shown) therein and a ram or plunger 156 extending vertically downwardly therefrom. The ram 156 has an enlarged diameter portion or hammer head 158 at its lower end for drivingly engaging the sticks or slips 95.

6. Means for sensing stick driver position

Means for sensing the position of the plunger 156 are also provided as shown in FIG. 4. These means include a home position sensor 157 and a full extension position sensor 159 mounted on the row planting unit 26, 28 adjacent the plunger 156. The plunger 156 is vertically extendable through the space between the face plates 106, 108 of the row planting unit 26, 28. An elongated guide bar 162 is rigidly mounted to at least one of the face plates so as to extend substantially vertically between the face plates 106, 108 adjacent to the path of the plunger 156.

7. Stabilizing mechanism

As best understood in view of FIG. 8, the stabilizing mechanism 38 helps operate the receiver assembly 118 to position the slips 95 and pivots the lower portion of the row planting unit 26, 28 to maintain the position of the plunger 156 directly over the slips during planting. The mechanism 38 includes a hydraulic cylinder 164 with an extendable ram 160. The mechanism 38 is pivotally attached or pinned to the adjustment brackets 58 on the support arms 48, 50 at one end and is pivotally connected to the lower portion of the row planting unit 26, 28 at the other end. The end attached to the adjustment bracket on the support arms 48, 50 can be positioned in any one of the lower three holes 60 therein so as to provide the desired movement to compensate for the forward travel of the planter 10 while the tree slip or stick is being planted. The ram 160 is controlled or released by the same solenoid valve 324 (FIG. 21) that operates the plunger 156. The ram 160 extends so as to pivot the row planting unit 26, 28 with respect to the support arm 46, 48 and ensure that the row planting unit 26, 28 maintains a constant position over the planting site despite the fact that the tractor 14 continues to pull the planter 10 along the ground 12 at a given speed. This constant position is maintained for a brief instant so that the slip or stick 95 can be driven into the ground in a substantially vertical orientation. With the hydraulic cylinder ram 156 and the stick 95 aligned in a substantially vertical way, the planting force is directed straight vertically or downwardly and the sticks are not as likely to split or otherwise become damaged. FIG. 8 shows the pivoting of the row planting unit 26, 28 as the ram 160 of the hydraulic cylinder 42 of the stabilizing mechanism 38 extends.

8. Electric and hydraulic system

As shown in FIG. 2, the generator 30 mounts on the frame 18 and supplies the 120 volt alternating current electrical power necessary to operate the PLC 104 and the other electrical components of the planter 10. Hydraulic fluid power is supplied by the tractor 14. Preferably the tractor 14 has a reservoir for hydraulic fluid thereon and provides the planter 10 with pressurized fluid (power) through a close centered hydraulic system on the tractor 14, capable of providing 2,000–2,500 pounds per square inch constant standby pressure.

Figure 21:
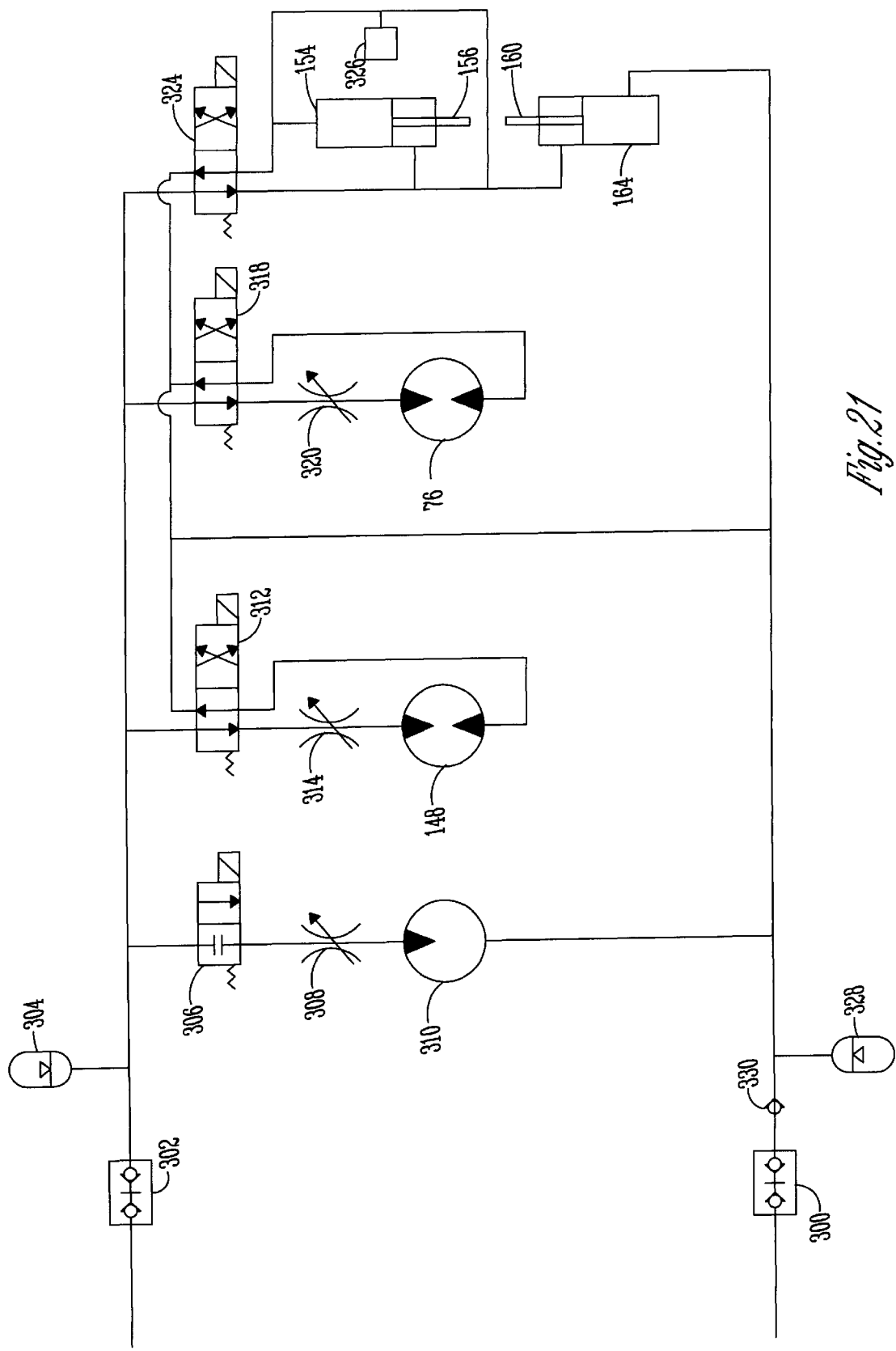
FIG. 21 is a simplified hydraulic schematic diagram for the tree planting apparatus of the present invention.

FIGS. 19–21 summarize the construction of the planter 10 from a simplified PLC input/output and hydraulic schematic point of view.

D. General Operation

The initial start-up of the planter 10 involves coupling it to the three-point hitch 16 of tractor 14. With the hydraulic power on, the main electrical switch 166 is turned on. The operator loads the sticks or slips 95 in the stick hopper 20 and loading zone 62. The driver then makes one pass to clear the row planting units 26, 28 and set the internal relays in ready to plant positions. If no tree or slip 95 is present above the receiver assembly 118, the unit conveyors 112, 114, 116 and the main conveyor(s) 64, 66 will start to run in an attempt to load a stick 95 into position above the receiver assembly 118, as shown in FIGS. 6 and 7.

From a position on the operator platform 24, the operator ensures that the main conveyor assembly 22 compartments are loaded with one tree or stick 95 per cell 71 until the main conveyor assembly 22 is full and a tree has been delivered above the receiver assembly 118 of each row planting unit 26, 28 being used. The sensor 266 detects when a stick 95 has been dropped from the conveyor belt 70 into the row planting unit 26, 28. Now the machine 10 is primed for planting so that the planter 10 can be lowered to the ground 12 and drawn forward by the tractor 14.

The sensors 119 directed at the channel between the unit conveyors 112, 114, 116 just above the receiver assembly 118 detect if a slip 95 is in proper position above the receiver assembly. An appropriate "present" or "not present" signal is sent to the PLC 104 by the sensors 119. A timer in the PLC 104 will cause another signal to be generated to deliver a stick or slip 95 alarm to be generated if a "present" signal is not received within a predetermined time after the conveyors 64, 66, 112, 114, 116 are turned on. The signal is repeated at a predetermined interval until a stick 95 passes the sensor 266 above the row planting unit 26, 28 or a predetermined time has elapsed. In the later case, an "empty main conveyor" signal can be generated by the PLC 104. If a stick 95 has passed sensor 266 but not sensor 119, the PLC 104 will signal that a jam has occurred in the unit conveyors 112, 114, 116.

The PLC 104 responds to a planting signal by loading a slip 95 into the receiver assembly 118. The PLC 104 sends a signal to the rotary motor 148 commanding it to rotate the drive pin 180 degrees counter-clockwise. The drive pin 150 moves up and down in the slots 126, 126A and moves the upper portions of the receiver plates 120, 124 so that they pivot forwardly (to the left in FIG. 5) about the first pivot pin 132. A sensor 172 (FIG. 4) detects that the receiver assembly 118 is now in the loading position. The tree slip 95 received above the receiver assembly 118 will no longer be supported by the upper portion of the receiver plate 120. Therefore, the slip 95 is automatically released and dropped by gravity into the receiver assembly 118 as shown. The tree slip 95 is guided in its fall by the trailing edges of the receiver plates 120, 124 and stops when it abuts the toe portion 134 of the receiver plate 120.

The sensor 146 (FIG. 4) verifies that the slip or stick 95 has dropped into the receiver assembly 118. A timer in the PLC 104 determines when adequate time has passed to ensure that the stick 95 has fully dropped against the toe portion of plate 120 so that it will not interfere with the movement of the plates 120, 124. The PLC 104 then commands the rotary motor 148 to rotate 180 degrees clockwise to bring the receiver assembly 118 into the standby position shown in FIG. 6.

When the receiver assembly 118 is in its standby position, the sensor 173 indicates this fact to the PLC 104. The PLC 104 then signals the conveyors 64, 66, 112, 114, 116 to advance and deliver the next stick 95 to the top of the receiver plate 120. The main conveyor 64, 66 advances one cell and sets a timer. The sensor 266 (FIG. 9A) detects whether a tree slip 95 has left the conveyor belt 70. If none has passed the sensor 266, another cycle of the conveyor 64, 66 will be initiated until a tree slip is detected falling into the row planting unit 26, 28. If the tree slip 95 has not been received at the sensor 119 (FIGS. 4, 6 and 7) at the top of the receiver assembly 118 within a specified time, the main conveyor 64, 66 will be driven again (a single cell at a time). This takes care of start up and empty compartments. Once the presence of the stick 95 is verified by the sensors 119, the PLC commands the conveyors 64, 66, 112, 114, 116 to stop. The next slip 95 is held in this position until another planting signal is received from a signal generating means such as, in this embodiment, the PPU 102 and signal wheel 34.

FIG. 21 depicts the hydraulic circuit for one of the row planting units 26, 28 of the planter 10. An identical circuit is provided for each row planting unit. The circuit is supplied with hydraulic fluid from a pump (not shown) that is conventionally included on the tractor 14. Many of the components of the hydraulic circuit will be recognized by their reference numerals as having been described earlier.

However, some of the components have not yet been described. Quick disconnect couplings 300, 302 are provided for connecting the planter hydraulic circuit to the hydraulic circuit of the tractor 14. A high pressure accumulator 304 is located downstream of the inlet quick disconnect coupling 302. A solenoid-operated control valve 306 connects through a variable orifice 308 to the unidirectional motor 310 that drives the unit conveyors 112, 114, 116 through the drive belt 101. The control valve 306 is spring-biased so that it is normally closed until the solenoid opens it. Another solenoid-operated control valve 312 connects through a variable orifice 314 to the bi-directional rotary motor 148 that moves the receiver assembly 118. A third solenoid-operated control valve 318 connects through a variable orifice 320 to another bi-directional motor 76 that drives the main conveyor 64 or 66.

A two-position control valve 324 coordinates the delivery of pressurized fluid or drains the same from three hydraulic devices, including cylinders 154, 164 and hydraulic brake 326, in a coordinated manner. A low pressure accumulator 328 and a check valve 330 are provided in the return line.

As best understood in view of FIG. 21, the PLC 104 is connected to the electric and hydraulic circuits so that the act of returning the plunger 156 of cylinder 154 to its raised or home position simultaneously pressurizes one side of the stabilizing mechanism cylinder 164 so that its ram 160 retracts. This causes the receiver plate 124 to move rearwardly and eject the slip 95 as shown in FIG. 6. At this point, the stick or slip 95 is supported vertically by opposing and resiliently deflectable fingers 168 that are attached to the respective face plates 106, 108 and protrude under the ejected slip 95.

Then the PLC 104 commands a timer to start and the plunger 156 of the hydraulic driver assembly 152 to drive the stick or slip 95 downward. The hydraulic pressure that drives the plunger 156 down is also used in this embodiment to simultaneously apply the hydraulic brake 326 on the wheels 94, 96. The release of the hydraulic pressure that had formerly held the plunger 156 raised in the home position also releases the pressure holding the ram 160 of the cylinder 164 of the stabilizing means 38 in the retracted position. Thus, as the plunger 156 forces the stick 95 into the slot created by the coulter wheel 36, the lower portion of the row planting is held stationary by the brake 326 on the wheels 94, 96 so the stick 95 is planted vertically in the soil. In order to accomplish this, the lower portion of the row planting unit pivots about pin 56 and the ram 160 of cylinder 164 is extended. See FIGS. 7 and 8.

When the lower end of the head 158 of plunger 156 first passes the sensor 159, another timer in the PLC 104 starts. If the upper end of the head 158 also passes the sensor 159 within a predetermined time, that indicates that the capacity of the hydraulic cylinder 154 was not exceeded and the stick 95 was planted to the desired depth. The instant the sensor 159 cannot any longer "see" the plunger 156, a signal is sent to the PLC 104 and the plunger 156 is returned to its home position. At any rate, the plunger 156 is returned to a home position once the allotted time has expired on either of the timers. (The act of applying hydraulic pressure to return the plunger 156 simultaneously releases the brake 326 and returns the ram 160 in cylinder 164 of the stabilizing means 38 to its home position, as indicated by the dashed lines in FIG. 8.)

The trailing wheels 94, 96 compact the ground 12 around the planted slip 95. The particular size, shape, tread style, etc. of the wheels 94, 96 can be varied, as is well-known in the agricultural arts, to optimize performance based on the soil type. The home position sensor 157 senses the return of the plunger 156 to its home position. The logic of the PLC 104 initiates the next planting cycle by returning the receiver assembly 118 to the loading position shown in FIG. 5 and resetting the "to depth" sensor 159 once the plunger 156 has both passed the "to depth" sensor 159 and returned to the home position as indicated by the sensor 157. A new planting cycle can be initiated by the pulse counter in the PLC 104 as soon as the receiver assembly 118 is detected to be in the home or ready for planting position. A planting cycle cannot be initiated unless sensors 159, 119 have indicated that a tree, stick or slip is in position above the receiver assembly 118 and the plunger 156 has previously driven a stick 95 to depth.

E. Planting Signal Generation with Signal Wheel

One can appreciate that the planting signal can be generated in a variety of ways. In the embodiment shown in FIGS. 1–9, a simple electromechanical signal wheel 34 and PPU means 102 are utilized to generate the planting signal. The planter 10 is designed to move forward at a speed of approximately 0–4 miles per hour, depending upon the ground conditions. Each time the signal wheel 34 rotates a given distance, a pulse is generated by the PPU 102 and relayed to the PLC 104. A pulse count is maintained by a counter in the PLC 104. See FIG. 20. When the pulse count reaches a predetermined value set by the operator corresponding to the desired spacing between the planted sticks, a planting signal is generated to the stick driver assembly 152. Then the planting cycle proceeds as described above.

II. Frictional Sled Embodiment

Another embodiment of this invention is shown in FIG. 10. In this embodiment, a pair of laterally spaced sleds 176, 178 or a single longitudinally slotted sled is utilized instead of ground support wheels. The sleds 176, 178 have upwardly curved forward ends, which allow them to be slid across the ground 12. The sleds 176, 178 are rigidly attached to the row planting unit 26, 28 and are connected to the adjustment bracket 58 of the stabilizing mechanism 38 by spaced apart arms 180, 182 that have upper ends pivotally attached to the adjustment bracket 58 and lower ends pivotally attached to a bracket 184 rigidly mounted on the sled 176, 178. The sleds 176, 178 frictionally contact the ground 12 and therefore provide an automatic braking action during the planting cycle, functionally replacing the brakes. The stick 95 is planted in the slot formed by the coulter wheel 36, which is aligned with a space between the sleds 176, 178. The row planting unit 26, 28 still pivots so as to keep the plunger 156 stationary in relation to the point of contact that the stick 95 makes with the ground 12. The sled embodiment performs well when the ground is substantially sandy and soft. The wheeled embodiment performs better in uneven, hard or sticky soil.

III. Drip Hose Nozzle Sensing Embodiment

Another embodiment of this invention, which is shown in FIGS. 11–14, is useful in arid climates or in localities where the soil lacks adequate moisture and/or nutrients for proper tree growth. Conventional irrigation drip hoses 184 are provided in the field rows. The drip hoses 184 are laid in rows according to a predetermined plan using conventional surveying or global positioning techniques. The drip hoses 184 include a plurality of drip nozzles 186 equally spaced at a predetermined interval therealong. One or more conventional irrigation pumps (not shown) supply fluid (typically water and other nutrients) under pressure to the drip hoses 184. The fluid drips out of the drip nozzles 186 at a predetermined rate, for example about one drip per second. Thus, if a tree or slip is planted within about +/−3 inches of the drip nozzle 186, it will receive a steady supply of moisture and nutrients.

The drip hoses 184 are typically constructed of a soft, pliable black plastic or rubber material. The drip nozzles 186 are integrally attached to the hose and in fluid communication with the inside of the hose 184. The drip nozzles 186 vary in design, but the currently known designs all result in a change in the size of the drip hose 184 at the locations of the drip nozzles 186. One commonly used drip hose nozzle is about one inch long, $3/16$ inch thick, and is substantially rigid. Therefore, one can squeeze the drip hose 184 into a substantially flat condition everywhere except at the nozzles 186. A distinct and perceptible bulge occurs in the drip hose 184 at the drip nozzles 186 when the hose is squeezed. The embodiment of FIGS. 11–18 utilizes these bulges in the drip hose 184 to generate a planting signal to the PLC 104 and plant a tree slip 95 close to each drip nozzle 186.

One complication to this method of generating a planting signal is that splices placed on the hose to repair damage caused by rabbits or other sources also show up as hard bulges or size changes. Therefore, the PLC 104 is programmed not to treat such randomly occurring size variations as if they were drip nozzles. The logic requires that bulges be ignored unless they appear at approximately the expected distance from the previously encountered drip nozzle. As discussed earlier, a signal wheel 34 and PPU 102 can be utilized to help the PLC 104 establish the expected distance between drip nozzles.

A. Drip hose nozzle sensing means

Figure 12:
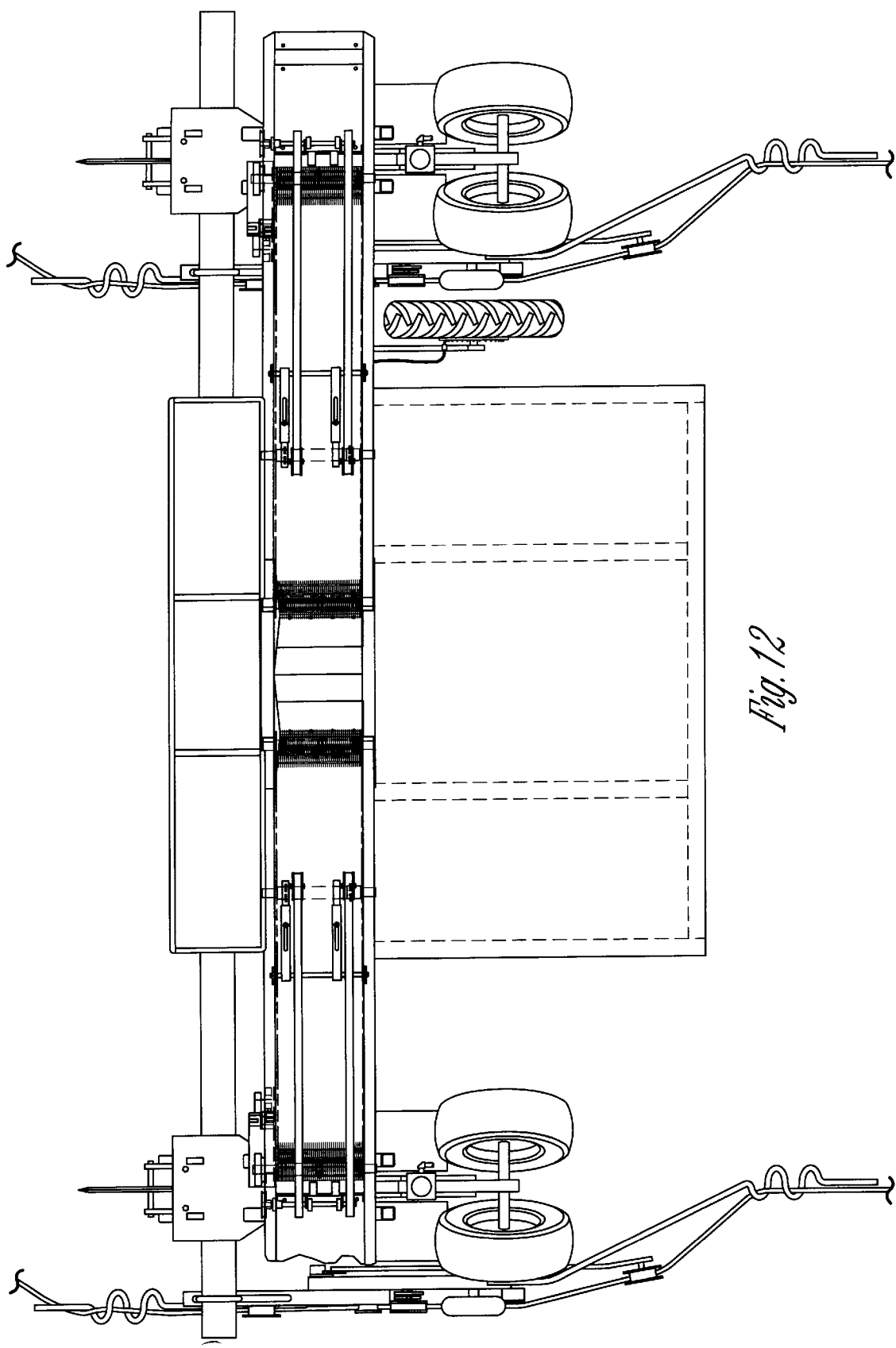
FIG. 12 is a rear elevation view of the tree planting apparatus of FIG. 11.

In FIGS. 11–18, guide hooks 188 (front) and 190 (rear) are mounted to the row planting unit 26, 28 to pick up the hose 184 and align it with the planting signal generating means 192 (drip hose nozzle sensing assembly) and then place it back on the ground 12 as close as possible to its original position and the planted slip 95. The guide hooks 188, 190 are located and shaped to move the hose 184 as little as possible while performing their function. The drip hose nozzle sensing assembly 192 has a frame that includes upper and lower support bars 208, 210 mounted to the tool bar 40. As can be seen in FIG. 12, the same means 192 can be utilized on both of the row planting units to maintain commonality of parts. The means 192 mounts to the outboard side of the left row planting unit 26, while it mounts to the inboard side of the right row planting unit 28.

The hose 184 passes under a forward or first slack sensing and control arm assembly 230 that includes an arm 232 with a pair of guide walls 234 mounted on one end so as to laterally guide the hose 184. The other end of the arm 232 is adjustably secured for rotation with the rotatable control spool 237 of a rotary spool control valve 238. The control valve 238 also has a housing or valve body 239 that is pivotally mounted to a vertical bar 244 so that it is rotatable relative to the spool 237. As is conventional in such control valves, the relative movement of the spool 237 and the body 239 opens, closes, or varies the size of internal ports (not shown) in the valve 238 so as to adjust the flow of hydraulic fluid through the valve 238, which is fluidly connected to pair of hydraulic motors 248, 250 that drive hose pulling tires 196, 198. The porting of the valve 238 is arranged so that raising the arm 232 tends to reduce or stop the flow of oil to the hydraulic motors 248, 250, thereby reducing the speed of the tires 196, 198. On the other hand, lowering the arm 232 increases flow to increase the speed of the motors 248, 250 and take up slack in the hose 184.

Figure 13:
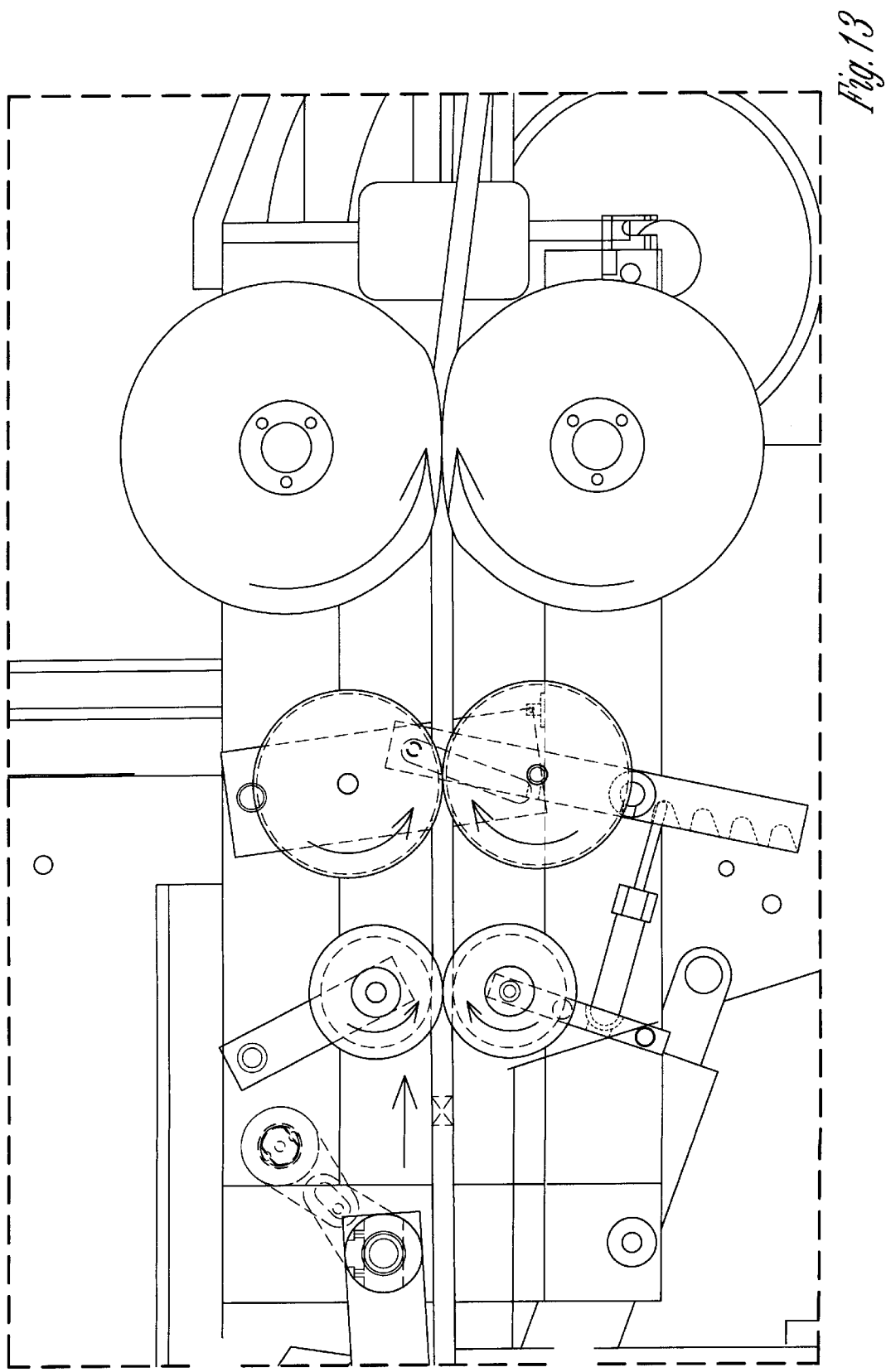
FIG. 13 is a side elevation view similar to FIG. 11 but shows the drip hose nozzle sensing mechanism enlarged and in greater detail.
Figure 14:
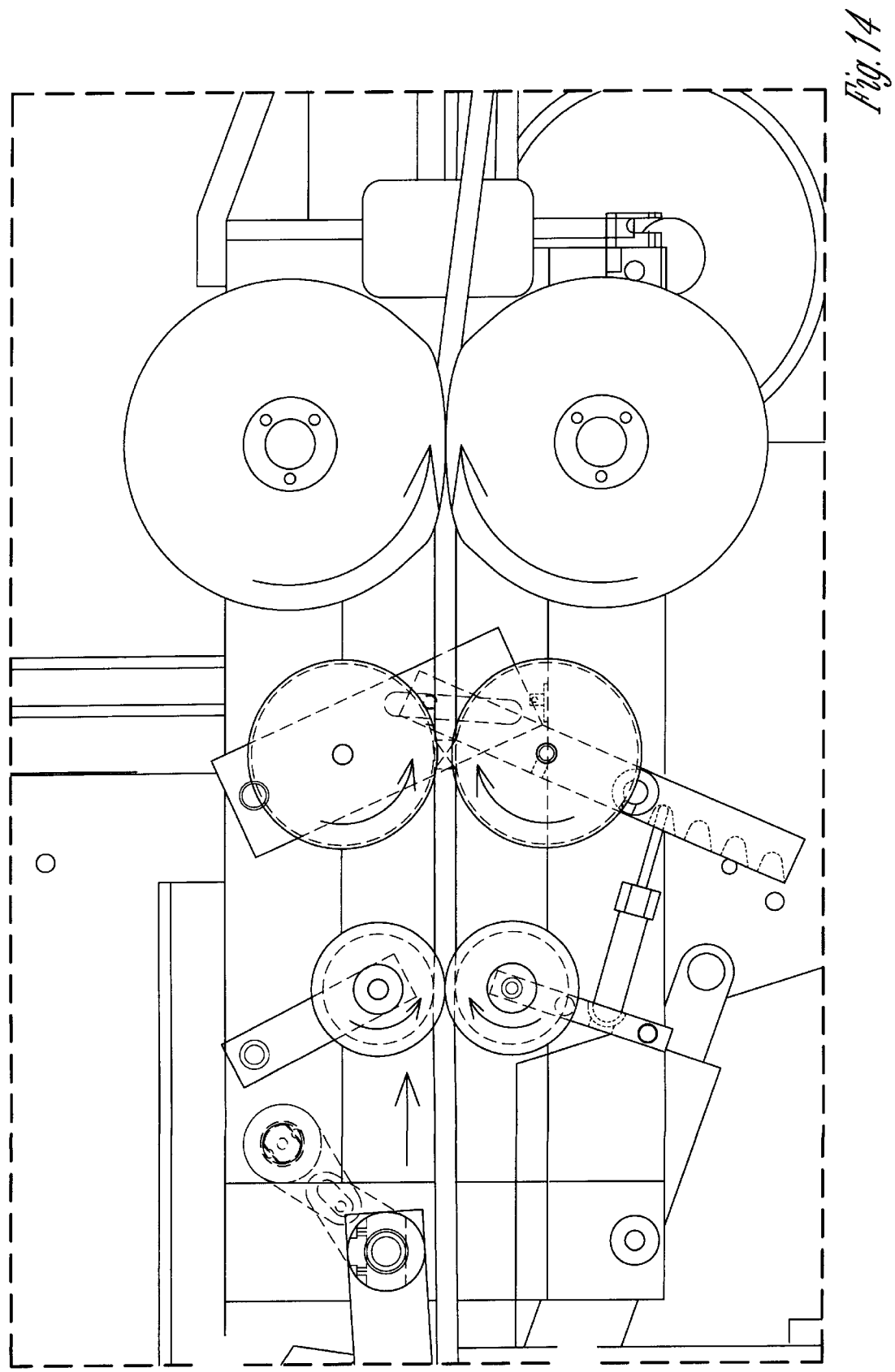
FIG. 14 is similar to FIG. 13 except that the drip hose nozzle is shown in a position where it urges the detection means to move, triggering a sensor and thereby causing a tree planting signal to be generated.

As best seen in FIGS. 13 and 14, a primary control link 242 is drivingly attached to the housing or valve body 239 of the control valve 238. The primary link 242 is connected by a pin in slot arrangement to a secondary link 246 that is rigidly secured to a pin 252 that is pivotally mounted to the upper support bar 208. The pin 243 can be attached to the link 242 and the slot 245 can be formed on the link 246, or vice versa. The distance which the pin 243 is offset from the center of the spool 239 can also be varied, if desired, to change the response of the control 238. As shown in FIGS. 11 and 15–18, a rear or second slack sensing and control arm assembly 253 is adjustably and drivingly connected to the pin 252 and thereby to the link 246. The control arm assembly 253 includes an arm 254 that has one end connected to the pin 252 and a weighted hose slide 256 on its free end.

Thus, the position of the valve body 239 is controlled by the second slack sensing and control arm assembly 253 and the position of the valve spool 237 is controlled by the first slack sensing and control arm assembly 230. The control valve 238 responds to the movement of either arms by varying the hydraulic oil flow to the hydraulic motors 248, 250 to keep the desired slack in the hose 184, and to slow or stop the counter-rotating hose pulling wheels or tires 196, 198 when the forward travel slows or stops.

The hose 184 passes through the guide walls 234 to a set of opposing alignment wheels 212, 214 that each have a circumferential channel formed thereon to align the hose with the squeezing sensor wheels 204, 206. Wheel 212 is mounted on the lower end of an arm 213 whose upper end is pivotally mounted on the upper support bar 208. A spring 215 maintains pressure to hold the wheel 212 in contact with the hose 184 and the hose 184 in contact with wheel 214. The variable pressure applied by wheel 212 allows for splices or different kinds of nozzles to pass through the hose sensing assembly 192.

The hose 184 enters between the nozzle sensing wheels 204, 206 where it is squeezed until the top and bottom sides of the hose are in contact with each other by hydraulic pressure applied by cylinder 258 through the sensor linkage 260, 262 and pin and roller 264. Referring to FIGS. 13 and 14, wheel 204 rotatably mounts on the intermediate portion of a link 260. The intermediate portion of the link 260 is itself pivotally mounted to the lower support; bar 210 as shown. The lower end of link 260 has a plurality of longitudinally spaced cavities formed therein for receiving the ram of a hydraulic cylinder 258. This provides adjustment for the squeezing pressure on the wheels 204, 206.

Wheel 206 is rotatably mounted on the intermediate portion of a link 262. The link 262 is pivotally mounted to the upper support bar 208. A slot 224 is formed through the link 262 at its lower end. A pin 264 is fixed in the upper end of the link 260. The pin 264 moves along the length of the slot 224 to maintain the relative (preferably perpendicular) position of the wheels 204, 206 when bulges in the hose 184 are encountered.

As the hose 184 is pulled through the wheels 204, 206, the wheels are spread apart and thereby pivoted in concert with each other, as shown in FIG. 14, when a bulge is encountered. The extra thickness of the drip nozzle 186 causes the links 260, 262 to pivot. The movement of link 260 changes the state of the proximity switch 228, causing it to signal the PLC 104 that a drip nozzle 186 (or other object) has been located in the hose 184. Logic within the PLC 104 prevents a second pulse from triggering another tree planting cycle until distance of almost equal to the spacing between nozzles has been traveled. This prevents false outputs due to sensor wheel bounce or repair couplers.

The hose 184 proceeds through the nozzle sensing wheels 204, 206 to the hose pulling wheels 196, 198. The hose pulling wheels 196, 198 are mounted on the shafts of hydraulic motors 248, 250 respectively. The wheels 196, 198 are vertically aligned inflatable balloon type tires. The tire and/or tube used on the wheels 196, 198 must have very low pressure and be flexible enough to allow nozzles and repair couplings to be submerged in the tire medium while being smoothly pulled through the drip nozzle sensing assembly 192. The control of wheel speed was described above.

Figure 15:
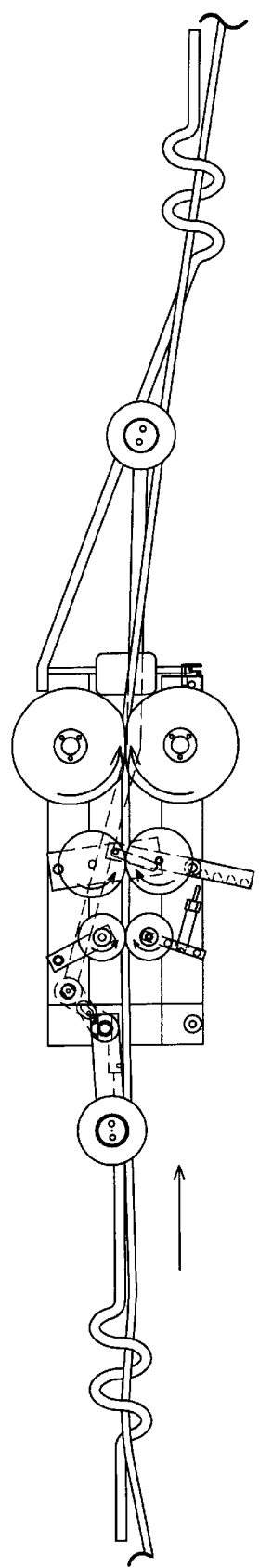
FIG. 15 is a simplified side elevation view showing the condition of the drip hose nozzle sensing mechanism of FIG. 13 when the hose is being followed, sensed, and laid back down in the desired taut (no-slack) condition.
Figure 16:
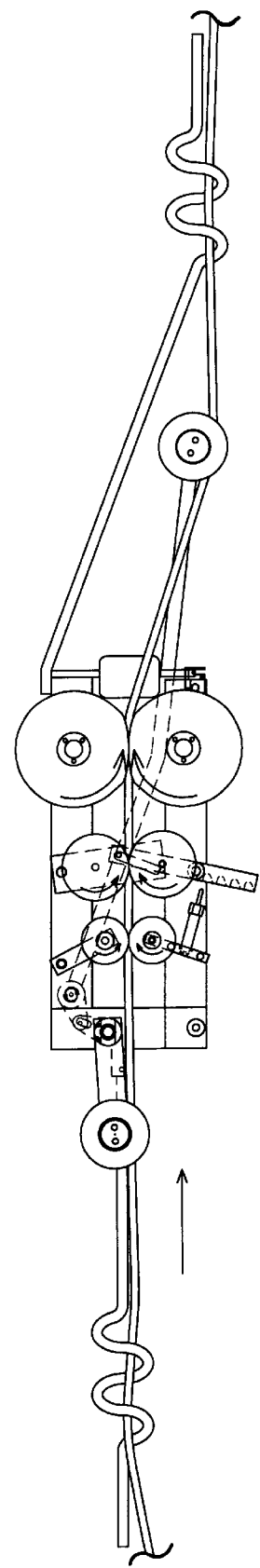
FIG. 16 is similar to FIG. 15 but shows the condition of the drip hose nozzle sensing mechanism when the hose is being fed through too quickly and slack is thereby generated behind the hose pulling wheels.
Figure 17:
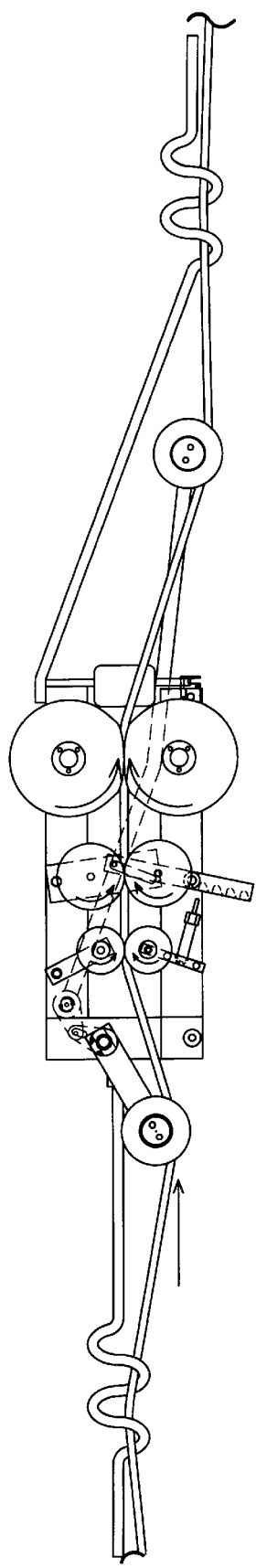
FIG. 17 is similar to FIG. 15 but shows the condition of the drip hose nozzle sensing mechanism when the hose is not being fed through quickly enough and slack develops in front of the hose pulling wheels.

FIG. 15 shows the condition of the drip hose nozzle sensing mechanism of FIG. 13 when the hose is being followed, sensed, and laid back down in the desired taut (no-slack) condition. FIG. 16 shows the condition of the drip hose nozzle sensing mechanism when the hose is being fed through too quickly and slack is thereby generated behind the hose pulling wheels. The control valve 238 will respond by slowing down the hydraulic motors 248, 250 that drive the pulling wheels 196, 198. FIG. 17 shows the condition of the drip hose nozzle sensing mechanism when the hose is not being fed through quickly enough and slack develops in front of the hose pulling wheels. The control valve 238 will respond by speeding up the hydraulic motors 248, 250 that drive the pulling wheels 196, 198.

As best seen in FIG. 11, the nozzle sensing wheels 204, 206 are located near the stick driver assembly 152. In particular, the sensing pulleys 204, 206 are located forward of the plunger 156 so that the nozzle 186 is detected and the planting signal generated with adequate lead time for the stick plunger 156 to plant the tree slip in the desired position (adjacent to the drip nozzle 186). This means and method plants the slips within a 3 inch radius from the drip nozzles 186. Furthermore, the protrusion of the slip 95 from the ground 12 is controlled at 1 inch +/−0.5 inches. This generally leaves one or more buds exposed above the ground.

The lower support bar 210 pivots down so that the wheels 196, 198, 212, 214, 204, 206 and the pressure on the drip hose 184 can be released for loading and unloading purposes. As best seen in FIG. 14, conventional clamping and securing means 216, 217, 218 (including a DeStaCo Model 301 type clamp 216, a retaining chain 217 and an anchor bar 218) are provided to selectively clamp the upper and lower support bars 208, 210 together once the hose 184 has been loaded. A pull pin 220 insures that the clamp is retained in the anchor bar 218, even when the lower support bar is lowered. The upper wheels 196, 204, 212 register in vertical alignment with the lower wheels 198, 206, 214 respectively when the support bars 208, 210 are drawn close and latched together.

B. Operating the drip hose embodiment

Figure 18:
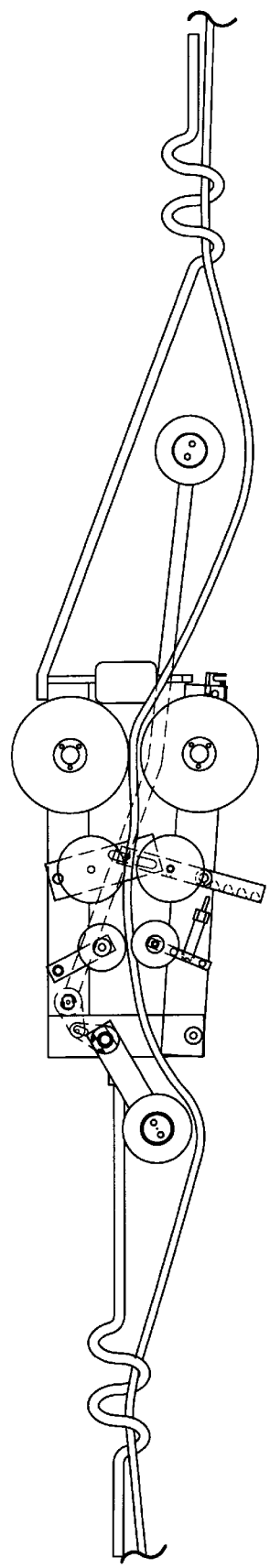
FIG. 18 is similar to FIG. 15 but shows the drip hose nozzle sensing mechanism opened for the purpose of inserting the hose.

To operate the drip hose nozzle sensing embodiment, the user follows the same general procedures described above, but positions the planter 10 so that the coulter wheels 36 and the respective row planting units 26, 28 are aligned with the respective drip hoses 184. The operator unlatches the lower support bar 210 from the upper support bar 208, as shown in FIG. 18. The operator threads the drip hose 184 through the hose retaining guide hooks 188, 190 through the signal generating means 192, and over the guide pulley 234 of the slack take-up mechanism 230. Then the lower support bar 210 is raised and latched to the upper support bar 212 so that the tires 196, 198 engage the hose 184 and the hose passes between the sensing pulleys 204, 206 and guide pulleys 212, 214. The drip hose 184 should be conventionally pressurized with fluid for optimum nozzle sensing results. As the tractor 14 draws the planter 10 through the field with the row planting unit 26 and/or 28 following the drip hose(s) 184, the nozzle sensing wheels 204, 206 of the sensing mechanisms 192 detect the drip nozzles 186 and signal the PLC 104 through the proximity switch 228 to plant the slip(s) 95.

IV. Alternative Ways of Generating a Planting Signal

Table 1 below shows various ways that a planting signal can be generated to the PLC, categorized as electronic or electromechanical; and time, travel, or coordinate-based.

TABLE 1

Ways of Generating a Planting Signal

|  | ELECTRONIC | ELECTRO-MECHANICAL |
| --- | --- | --- |
| Position | GPS | Drip Hose |
| Time | Timer |  |
| Distance Traveled |  | Signal wheel/PPU |

In the electronic category, a computerized global positioning system (GPS) can be provided on the tractor 14. A receiver 236 (FIG. 1) mounted on the tractor 14 receives signals from a plurality of satellites that are orbiting the earth. The GPS includes an onboard microprocessor to accurately determine the instantaneous position of the tractor 14 and thereby the row planting units 26, 28 that are attached to the tractor at known distances from the receiver 236. These instantaneous positions or coordinates are compared to the desired pre-established coordinates for the planted trees. A planting signal is generated by the global positioning system and sent to the PLC 104 to eject the stick 95 from the receiver assembly 118 and drive the plunger 156 downward when it is anticipated that the plunger 156 will be over the desired planting coordinates.

Another coordinate-based means utilizes the irrigation drip hoses 118 that have previously been laid down using GPS or conventional surveying techniques. This means has already been discussed briefly above and is disclosed in FIGS. 11–14.

Another electronic method is time-based because a timer signals the PLC 104 to initiate the planting of a tree slip 95 when a given time interval expires. For example, the timer might be set to 6 seconds and a tree slip 95 would be planted every 6 seconds. The main shortcoming of such a system is that it is difficult to control the speed and direction of the tractor 14 to the degree necessary to achieve the desired accuracy. Usually specifications require the trees to be planted within a three inch radius of the desired coordinates.

An electromechanical planting signal generating means that is based upon the distance traveled by the planter 10 is disclosed in FIGS. 2 and 3. A signal wheel 34 that has a known circumference is rotatably mounted on the planter 10 adjacent the ram 156 of the row planting unit 26, 28. The pulse pickup device (PPU) 104 mounted on the frame 18 adjacent to the sprocket 98 generates a pulse to the PLC 104 each time one of the teeth 100 passes by the PPU. The PLC 104 includes a counter which stores the number of pulses received and the PLC initiates the downward stroke of the ram 156 when the number of accumulated pulses reached a predetermined value corresponding to a specific distance the signal wheel 34 has traveled (the desired distance between planted trees). The counter is then reset to zero and the pulses are accumulated again. The results are quite accurate and reliable, although the presence of larger rocks, mounds and other ground irregularities can lead to some inaccuracies.

The invention is useful for planting a variety of trees including, but not limited to, hybrid popular and cottonwood trees. This invention is also useful for planting any plant that is propagated by the use of cuttings or slips.

Therefore, it can be seen that the present invention at least achieves its stated objectives.

In the drawings and specifications, there has been set forth a preferred embodiment of the invention, and although specific terms are employed, these are used in a generic and descriptive sense only and not for purposes of limitation. Changes in the form and proportion of parts as well as in the substitution of equivalents are contemplated as circumstances may suggest or render expedient without departing from the scope of the invention.

What is claimed is:

1. An apparatus for planting elongated tree slips in the ground comprising:

a frame movable in a direction of travel across the ground;

at least one row planting unit including a lower portion, an upper portion pivotally mounted to the frame, and a driver assembly having an elongated downwardly movable plunger for applying a purely longitudinal planting force to an end of each of the tree slips to drive the tree slips individually into the ground;

a brake on lower portion of the row planting unit for temporarily halting movement of the lower portion across the ground while the plunger moves downwardly;

a retractable and extensible stabilizing mechanism operatively positioned between the frame and the row planting unit for pivoting the row planting unit with respect to the frame during the application of the planting force such that the plunger is maintained in a position directly over the slip being driven and horizontally stationary with respect to the ground, despite movement of the frame across the ground.

2. The apparatus of claim 1 wherein the stabilizing mechanism is a hydraulic cylinder having an extensible ram connected to the lower portion of the row planting unit.

3. The apparatus of claim 1 comprising:

a planting signal generator; and a programmable logic controller connected to the planting signal generator, the row planting unit and the stabilizing mechanism so as to receive a signal from the planting signal generator and in response thereto send command signals to the driver assembly and the stabilizing mechanism to control the driving of the tree slips into the ground.

4. The apparatus of claim 3 comprising a hydraulic conveyor motor drivingly connected to a main conveyor that operatively extends over the row planting unit and is mounted to the frame, the hydraulic conveyor motor being controlled by the programmable logic controller so as to advance the main conveyor to deliver tree slips to the row planting unit.

5. The apparatus of claim 3 comprising a tree slip sensing system operatively associated with the row planting unit, the tree slip sensing system including at least one sensor mounted upwardly adjacent to the receiver assembly and electrically connected to the programmable logic controller so as to indicate if there is a tree slip present in a ready-to-load position upwardly adjacent the receiver assembly.

6. The apparatus of claim 5 wherein the tree slip present sensor is a diffused light sensor.

7. The apparatus of claim 3 comprising a receiver position sensing system operatively associated with the row planting unit and electrically connected to the programmable logic controller, the receiver position sensing system including a first sensor mounted on the row planting unit so as to signal the programmable logic controller when the receiver assembly is in the forwardly inclined position and a second sensor mounted on the row planting unit so as to signal the programmable logic controller when the receiver assembly is in the substantially vertical position.

8. The apparatus of claim 3 comprising a plunger position sensing system operatively associated with the row planting unit and electrically connected to the programmable logic controller, the plunger position sensing system including a first plunger sensor mounted on the row planting unit so as to signal the programmable logic controller when the plunger is in a home position above and a second plunger sensor mounted on the row planting unit so as to signal the programmable logic controller when the plunger has been extended to a predetermined depth below the home position.

9. The apparatus of claim 3 wherein the signal generator is a drip hose nozzle sensing assembly having a pair of opposing sensing wheels thereon for squeezing a drip hose and generating a signal to the programmable logic controller based upon detecting a drip nozzle on the drip hose.

10. The apparatus of claim 9 wherein the drip hose nozzle sensing assembly includes:

a subframe attached to the frame and extending alongside the row planting unit, the subframe being position-adjustable with respect to the row planting unit along the direction of travel;

a pair of opposing wheels mounted on the subframe and counter-rotated by at least one wheel drive motor so as to frictionally engage and pull a drip hose through a hose nozzle sensing mechanism;

the wheel drive motor being hydraulically controlled by a rotary spool control valve responsive to a slack take-up mechanism operatively attached to the drip hose and the control valve.

11. The apparatus of claim 10 wherein the control valve has a movable valve body and a spool rotatably disposed in the valve body, the slack take-up mechanism including a front tension sensing arm drivingly attached to the spool of the control valve and a rear tension sensing arm drivingly attached to the body of the control valve.

12. The apparatus of claim 9 wherein the hose nozzle sensing mechanism includes a pair of opposing nozzle sensing wheels and a sensor for detecting movement of the sensing wheels away from each other, the sensing wheels being biased toward each other and toward the drip hose such that the sensing wheels are normally clamped against the drip hose to squeeze the drip hose into a substantially flat condition and the sensing wheels move away from each other to trigger the sensor when a bulge of a predetermined size is encountered in the drip hose.

13. The apparatus of claim 1 comprising a receiver assembly that includes an upper portion and a lower portion, the lower portion being pivotally mounted on the lower portion of the row planting unit, a rotary motor drivingly connected to the upper portion of the receiver assembly so as to move the receiver assembly between a first forwardly inclined position for receiving one of the tree slips and a second substantially vertical position for ejecting said tree slip, an ejection mechanism for ejecting the slip from the receiver assembly, and a driver assembly for driving the ejected tree slip into the ground by striking an upper end of the ejected slip with a substantially linear downward force.

14. The apparatus of claim 13 wherein the receiver assembly includes a plurality of receiver plates, at least one of the receiver plates being a support plate and at least one of the plates being an ejection plate that defines a portion of the ejection mechanism, the support plate and ejection plate being pivotally connected together.

15. The apparatus of claim 14 wherein the support plate has a lower portion pivotally connected to one of the face plates and including a flange thereon protruding rearwardly in a horizontal direction for catching and vertically supporting the tree slip; the support plate further including an upper portion having a slot and a first pivot hole therein, the slot extending vertically, the first pivot hole being located above the slot, and a second pivot hole being located in the lower portion of the support plate.

16. The apparatus of claim 15 wherein the ejection plate has a lower portion that includes a forwardly protruding heel portion having a slot extending horizontally therethrough; a link having a fixed length has one end pivotally connected to the heel portion and another end pivotally connected to the row planting unit at a fixed location offset vertically from the heel portion.

17. The apparatus of claim 1 wherein said at least one row planting unit includes at least a pair of row planting units that are laterally spaced on the frame with respect to the direction of travel.

18. The apparatus of claim 1 wherein the frame includes a pair of laterally spaced wheels mounted on the frame so as to extend rearwardly of the driver assembly on each row planting unit and arranged so as to compact the ground around the planted tree slips.

19. The apparatus of claim 1 wherein the brake comprises a hydraulic brake operatively associated with one of the wheels.

20. The apparatus of claim 1 wherein the frame includes a least one substantially horizontal sled member rigidly attached to the lower portion of each row planting unit and said sled frictionally contacts the ground so as to constitute the brake.

21. The apparatus of claim 1 wherein a trench opening device mounts on the frame and is aligned with and extends forward of the row planting unit in the direction of travel to engage the ground and open a slot therein into which the tree slips are planted.

22. The apparatus of claim 1 wherein the row planting unit has a pair of parallel face plates defining a channel therebetween for receiving the tree slips such that a longitudinal axis of the tree slips extends substantially parallel to the face plates.

23. The apparatus of claim 22 comprising at least one unit conveyor rotatably mounted between the face plates of the row planting unit for urging the tree slips toward the receiver assembly.

24. The apparatus of claim 1 wherein the signal generator includes a ground engaging signal wheel having a known circumference and pulse pickup means associated with the signal wheel for generating pulses to the programmable logic controller based on a distance traveled by the signal wheel along the ground.

25. A method of planting elongated plant slips comprising:

providing a tree planting machine including a frame movable across ground, a row planting unit having a lower portion and an upper portion pivotally mounted to the frame, a driver assembly mounted on the row planting unit and having an elongated downwardly movable plunger for applying a planting force to drive the plant slips into the ground, a retractable and extensible stabilizing mechanism being operatively interposed between the frame and the lower portion of the row planting unit for pivoting the latter with respect to the former, and a brake for halting movement of the lower portion of the row planting unit across the ground; and applying the brake to temporarily halt movement of the lower portion of the row planting unit along the ground while simultaneously extending the stabilizing mechanism and driving the plunger straight down so as to engage and drive the slip down into the ground with the a purely linear force.

* * * * *